United States Patent [19]
Dwelley et al.

[11] Patent Number: 6,166,527
[45] Date of Patent: Dec. 26, 2000

[54] CONTROL CIRCUIT AND METHOD FOR MAINTAINING HIGH EFFICIENCY IN A BUCK-BOOST SWITCHING REGULATOR

[75] Inventors: David M. Dwelley, Fremont; Trevor W. Barcelo, Mountain View, both of Calif.

[73] Assignee: Linear Technology Corporation, Milpitas, Calif.

[21] Appl. No.: 09/536,266

[22] Filed: Mar. 27, 2000

[51] Int. Cl.[7] ....................................................... G05F 1/10
[52] U.S. Cl. ........................ 323/222; 323/282; 323/224; 323/283
[58] Field of Search .................... 323/222, 282, 323/224, 284, 283

[56] References Cited

U.S. PATENT DOCUMENTS 5,565,761  10/1996  Hwang ..................................... 323/282
6,037,755  3/2000  Mao et al. ............................... 323/222

*Primary Examiner*—Shawn Riley
*Attorney, Agent, or Firm*—Fish & Neave; Steven J. Cahill

[57] ABSTRACT

A high efficiency control circuit for operating a buck-boost switching regulator is provided. The switching regulator can regulate an output voltage higher, lower, or the same as the input voltage. The switching regulator may be synchronous or non-synchronous. The control circuit can operate the switching regulator in buck mode, boost mode, or buck-boost mode. In buck mode, the switching regulator regulates an output voltage that is less than the input voltage. In boost mode, the switching regulator regulates an output voltage that is greater than the input voltage. In buck and boost modes, less than all of the switches are switched ON and OFF to regulate the output voltage to conserve power. In buck-boost mode, all of the switches switch ON and OFF to regulate the output voltage to a value that is greater than, less than, or equal to the input voltage.

80 Claims, 14 Drawing Sheets

CONTROL CIRCUIT AND METHOD FOR MAINTAINING HIGH EFFICIENCY IN A BUCK-BOOST SWITCHING REGULATOR

BACKGROUND OF THE INVENTION

This invention relates to switching regulators. More specifically, this invention relates to control circuits and methods for controlling buck-boost switching regulators for maintaining high efficiency.

A switching regulator provides a regulated output voltage $V_{OUT}$ to a load from an unregulated input voltage $V_{IN}$. A synchronous switching regulator has at least two switches that switch ON and OFF out of phase with each other to supply current to a load. A control circuit controls the switching of the switches.

Referring to FIGS. 1A–1C, three prior art synchronous switching regulators are described. FIG. 1A illustrates a typical buck switching regulator 10, which may only regulate an output voltage $V_{OUT}$ that is lower than input voltage $V_{IN}$. FIG. 1B shows a typical boost regulator 12, which may only regulate an output voltage $V_{OUT}$ that is higher than $V_{IN}$. FIG. 1C illustrates a typical buck-boost switching regulator 14, which may regulate an output voltage $V_{OUT}$ that is higher, lower, or the same as input voltage $V_{IN}$.

Referring to FIG. 1A, synchronous buck switching regulator 10 has two switches A and B. A control circuit (not shown) switches A and B ON (closed) and OFF (opened) out of phase with each other to supply current to load 19. Switching regulator 10 includes input capacitor 16, synchronous switches A and B, inductor 17, and output capacitor 18. Input voltage source $V_{IN}$ and input capacitor 16 are coupled between a first terminal of switch A and GROUND. Switch B is coupled between a second terminal of switch A and GROUND. A first terminal of inductor 17 is coupled to the second terminal of switch A, and output capacitor 18 and load 19 are coupled between a second terminal of inductor 17 and GROUND.

Referring to FIG. 1B, synchronous boost switching regulator 12 has two switches C and D. A control circuit (not shown) switches C and D ON (closed) and OFF (opened) out of phase with each other to supply current to load 19. Switching regulator 12 includes input capacitor 16, synchronous switches C and D, inductor 17, and output capacitor 18. Input voltage source $V_{IN}$ and input capacitor 16 are coupled between a first terminal of inductor 17 and GROUND. Switch C is coupled between a second terminal of inductor 17 and GROUND. Switch D has a first terminal coupled to the second terminal of inductor 17, and a second terminal coupled to a first terminal of output capacitor 18. Output capacitor 18 has a second terminal coupled to GROUND, and load 19 is coupled between the first terminal of output capacitor 18 and GROUND.

Referring to FIG. 1C, synchronous buck-boost switching regulator 14 includes input capacitor 16, inductor 17, output capacitor 18, and switches A, B, C, and D. Switches A, B, C, and D may, for example, be metal oxide semiconductor field effect transistors (MOSFETs) or bipolar junction transistors (BJTs). Input voltage $V_{IN}$ and input capacitor 16 are coupled between a first terminal of switch A and GROUND. Switch B is coupled between a second terminal of switch A and GROUND. Inductor 17 is coupled between the second terminal of switch A and a first terminal of switch D, and switch C is coupled between the first terminal of switch D and GROUND. Output capacitor 18 and load 19 are coupled between a second terminal of switch D and GROUND.

Switching regulator 14 includes four switches (A, B, C, and D). A control circuit (not shown) switches A, B, C, and D ON and OFF to supply current to 15 load 19. Prior art control circuits typically switch A and C ON together and B and D ON together. Switches A and C are OFF when switches B and D are ON, and switches B and D are OFF when switches A and C are ON.

Prior art control circuits use the following repeating switching sequence: A and C ON, then B and D ON, then A and C ON, then B and D ON, etc. Thus, prior art control circuits switch all four switches ON and OFF in regulator 14 to supply current to load 19.

An example of a prior art control circuit that may be used with the regulators of FIGS. 1A–1C includes a pulse-width modulator that has a single comparator that compares a control voltage at its non-inverting input with a symmetric triangular (or asymmetric sawtooth) waveform signal at its inverting input to generate a digital pulse-width modulated signal. The control voltage is generated from the output voltage of the regulator. As the control voltage is swept from the bottom to the top of the waveform signal, the duty cycle of the pulse-width modulated signal increases from 0% to 100%. In a buck-boost regulator, the pulse-width modulated signal is used to drive switches A and C together, while the inverse of the pulse-width modulated signal is used to drive switches B and D together. The control voltage varies the duty cycle of the pulse-width modulated signal, and thus it also varies the input-to-output voltage ratio of the regulator.

Synchronous buck-boost regulators such as regulator 14 advantageously may be operated to provide a regulated output voltage over a wide variety of output-to-input voltage requirements. Prior art synchronous buck-boost switching regulator control circuits, however, disadvantageously always drive all four switches ON and OFF in each cycle to regulate $V_{OUT}$, regardless of the output current and the output-to-input voltage ratio. More power is consumed driving the switches ON and OFF, than when the switches remain either ON or OFF. More power is consumed by synchronous buck-boost regulator 14 than by synchronous buck regulator 10 or synchronous boost regulator 12, because only two switches have to be driven ON and OFF in regulators 10 and 12. Therefore, synchronous buck-boost switching regulator 14 is less efficient to use with a prior art control circuit than either synchronous buck regulator 10 or synchronous boost regulator 12.

A further disadvantage of switching regulator 14 used with a prior art control circuit is that the average inductor current is high. High average inductor current is undesirable because more power is consumed in the inductor to regulate the output voltage. The relationship between the average inductor current $\overline{I_{IND}}$ and the average output current $\overline{I_{OUT}}$ of switching regulator 14 used with a prior art control circuit may be expressed as:

$$\overline{I_{IND}} = \overline{I_{OUT}}\left(\frac{V_{OUT}}{V_{IN}} + 1\right) \qquad (1)$$

where $V_{OUT}$ is the output voltage and $V_{IN}$ is the input voltage of switching regulator 14. For example, when $V_{IN} = V_{OUT}$, the average inductor current is twice the average output current in switching regulator 14, assuming no loss.

It would, however, be desirable to provide a high efficiency buck-boost switching regulator control circuit that can regulate an output voltage that is higher, lower, or the same as the input voltage. It would also be desirable to provide a buck-boost switching regulator control circuit that conserves power by driving fewer than all of the switches when the input voltage is higher or lower than the output voltage. It also would be desirable to provide a buck-boost switching regulator that has a low average inductor current.

SUMMARY OF THE INVENTION

It is an object of the present invention to provide a high efficiency buck-boost switching regulator that can regulate an output voltage higher, lower, or the same as the input voltage.

It is a further object of the present invention to provide a buck-boost switching regulator control circuit that conserves power by driving less than all of the switches when the input voltage is higher or lower than the output voltage.

It is a further object of the present invention to provide a buck-boost switching regulator that has a low average inductor current.

These and other objects of the present invention are provided by control circuits that can operate high efficiency buck-boost switching regulators in buck mode when the input voltage is greater than the desired output voltage, in boost mode when the input voltage is less than the desired output voltage, and in buck-boost mode when the input voltage is higher, lower, or the same as the desired output voltage. The present invention also includes methods for regulating the output voltage of high efficiency buck-boost switching regulators in buck mode, boost mode, and buck-boost mode. During buck mode and boost mode, fewer than all of the switches are switched ON and OFF to provide current to the load. The other switches remain ON or OFF throughout buck or boost mode operation. During buck-boost mode, all of the switches are switched ON and OFF. This scheme conserves power because all of the switches are not switching ON and OFF in each cycle during buck mode and boost mode.

Control circuits of the present invention may control synchronous and non-synchronous buck-boost switching regulators. Control circuits of the present invention include pulse width modulator circuitry and logic circuitry. The pulse width modulator circuitry monitors the control voltage indicative of the output voltage to determine when to operate the switching regulator in buck mode, boost mode, or buck-boost mode. The pulse width modulator circuitry is coupled to logic circuitry that drives the switches ON and OFF. The present invention also includes methods for generating first and second voltage signals that are proportional to the regulated voltage output of the switching regulator, providing first and second periodic waveform signals, comparing the first voltage signal with the first periodic waveform signal to generate a first control signal, comparing the second voltage signal with the second periodic waveform signal to generate a second control signal, controlling the first switch with a first drive signal proportional to the first control signal, and controlling the second switch with a second drive signal proportional to the second control signal.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF THE PREFERRED EMBODIMENT

Figure 1A:
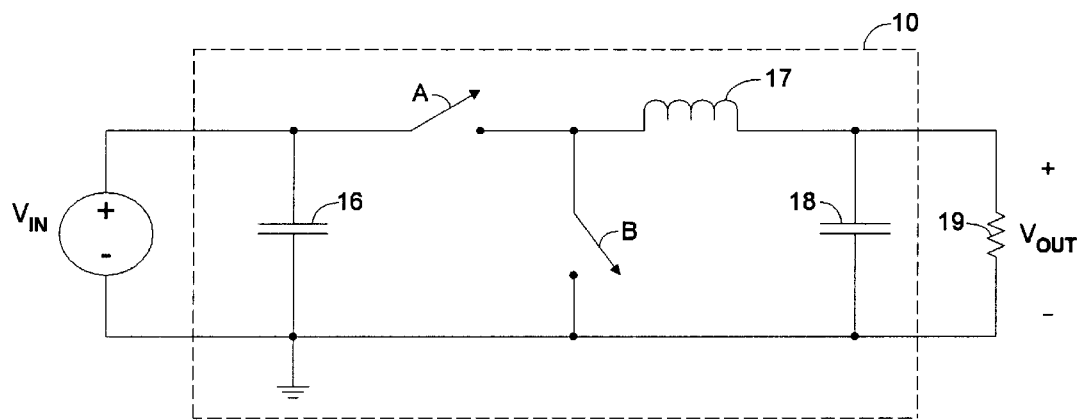
FIGS. 1A–1C are schematic diagrams of prior art synchronous switching regulators.
Figure 1B:
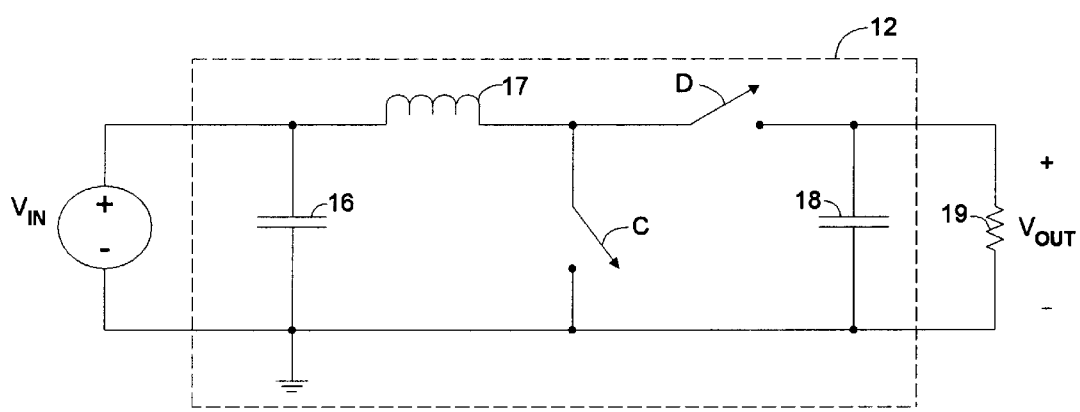
Figure 1C:
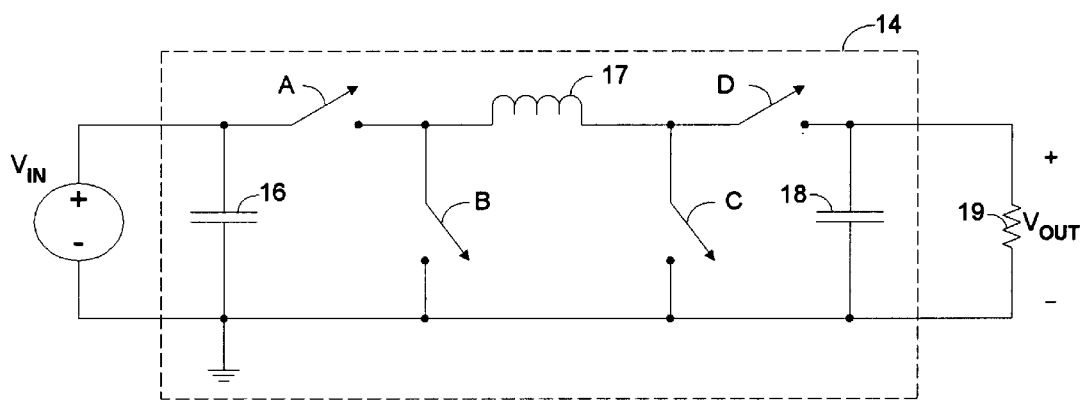
Figure 2A:
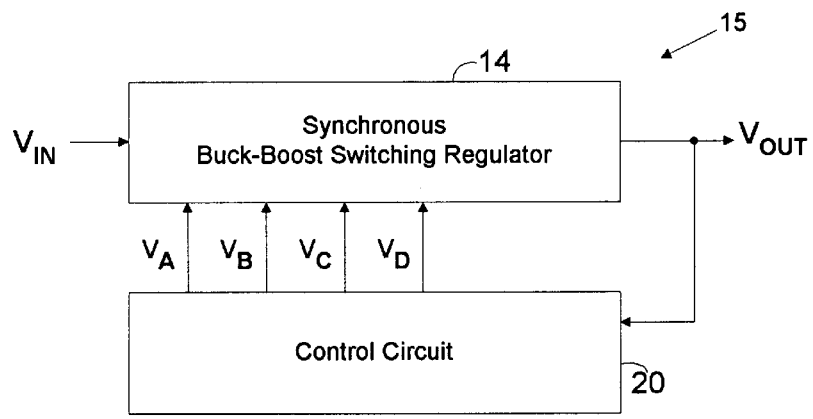
FIG. 2A is a block diagram of an illustrative embodiment of synchronous switching regulators with control circuits of the present invention.

Referring to FIG. 2A, a control circuit in accordance with the present invention is described. Power supply 15 includes synchronous switching regulator 14 and control circuit 20. Synchronous switching regulator 14 receives input voltage $V_{IN}$ and provides regulated output voltage $V_{OUT}$. Input voltage $V_{IN}$ may be higher, lower, or substantially the same as output voltage $V_{OUT}$. Control circuit 20 may operate switching regulator 14 in buck mode, boost mode, or buck-boost mode. Synchronous switching regulator 14 has four switches coupled between $V_{IN}$ and $V_{OUT}$ that control a supply of current to the output node at $V_{OUT}$ so that the output voltage may be maintained at the regulated value. Control circuit receives output voltage $V_{OUT}$ and provides four drive signals ($V_A$, $V_B$, $V_C$, and $V_D$) that control the switching of the four switches (A, B, C, and D) in synchronous switching regulator 14.

Figure 2B:
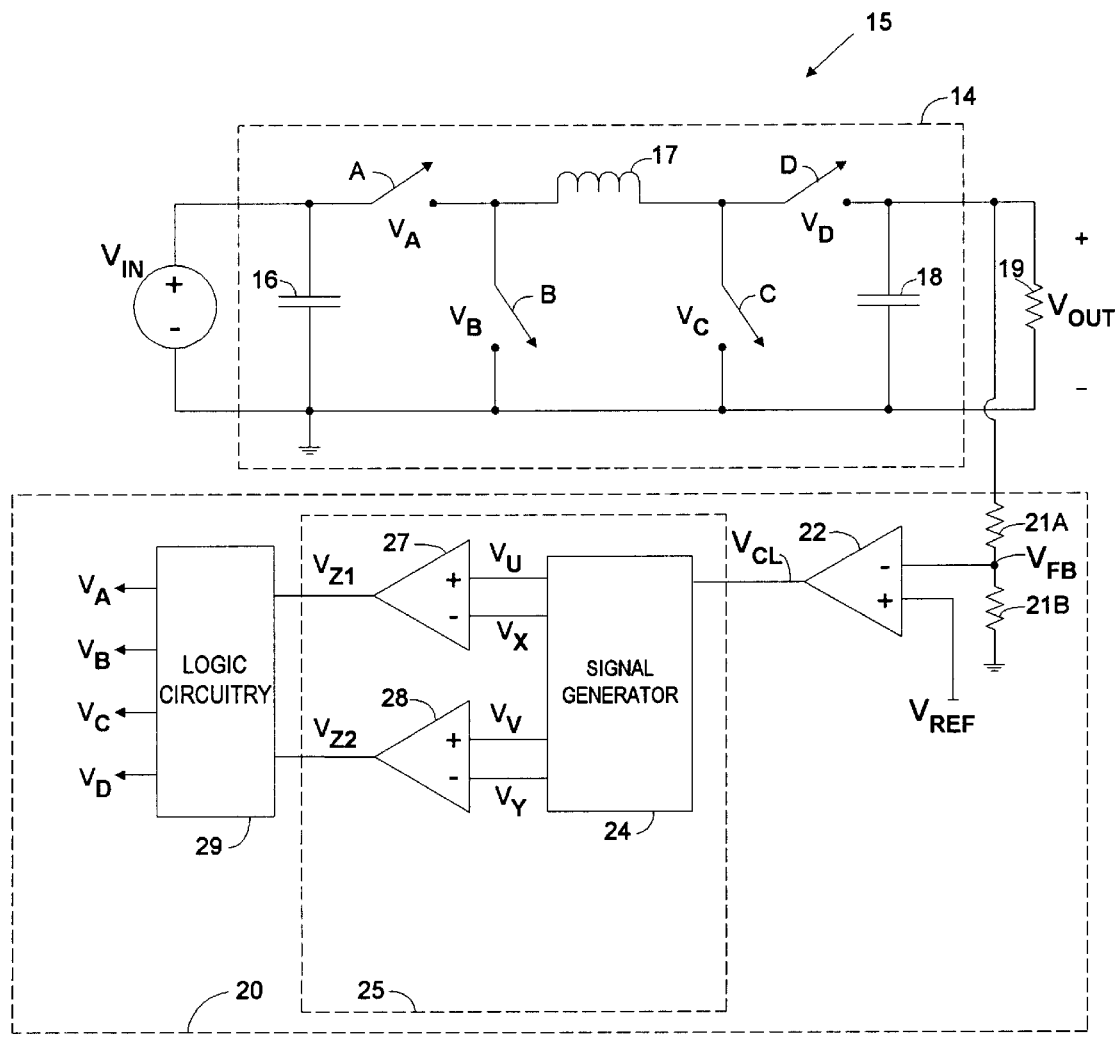
FIG. 2B is a schematic diagram of an illustrative embodiment of synchronous switching regulators with control circuits of the present invention.

Referring to FIG. 2B, an exemplary schematic diagram of power supply 15 is shown. Circuit 15 includes synchronous switching regulator 14 with four switches (A, B, C, and D) and control circuit 20. Switches A, B, C, and D are controlled by drive signals $V_A$, $V_B$, $V_C$, and $V_D$, respectively. Control circuit 20 includes resistors 21A and 21B, error amplifier 22, pulse width modulator 25, and logic circuitry 29. Pulse width modulator 25 includes signal generator 24, and comparators 27 and 28.

In buck mode, power supply 15 provides output voltage $V_{OUT}$ that is less than input voltage $V_{IN}$, and control circuit 20 turns switches A and B ON and OFF at the regulator's switching frequency $f_S$ while keeping switch D ON and switch C OFF. In boost mode, power supply 15 provides output voltage $V_{OUT}$ that is greater than input voltage $V_{IN}$, and control circuit 20 turns switches C and D ON and OFF at the regulator's switching frequency $f_S$ while keeping switch A ON and switch B OFF. In buck-boost mode, power supply 15 provides output voltage $V_{OUT}$ that is less than, greater than, or the same as input voltage $V_{IN}$, and control circuit 20 turns all four switches ON and OFF at the regulator's switching frequency $f_S$. Thus, control circuit 20 conserves power because all four switches switch ON and OFF only when the power supply operates in buck-boost mode.

Control circuit 20 allows only four switch states: switches A and C ON together, switches A and D ON together, switches B and C ON together, and switches B and D ON together. No more than two switches can be ON at once, and if a switch is not indicated as being ON, then it is OFF. Switches A and B cannot be ON together, because such a configuration would short $V_{IN}$ to GROUND. Switches C and D cannot be ON together, because such a configuration would short $V_{OUT}$ to GROUND. When switches A and C are ON, current flows between $V_{IN}$ and GROUND through inductor 17. When switches A and D are ON, current flows between $V_{IN}$ and $V_{OUT}$ through inductor 17. When switches B and C are ON, both of the terminals of inductor 17 are coupled to GROUND. When switches B and D are ON, current flows between GROUND and $V_{OUT}$ through inductor 17.

The steady-state operating point of a synchronous switching regulator in accordance with this invention is readily obtained by considering the average voltage across inductor 17, which may be expressed as:

$$\overline{V_{IND}} = \frac{V_{AC} t_{AC} + V_{AD} t_{AD} + V_{BC} t_{BC} + V_{BD} t_{BD}}{T} \quad (2)$$

where $\overline{V_{IND}}$ is the average voltage across inductor 17; $t_{AC}$, $t_{AD}$, $t_{BC}$, and $t_{BD}$ are the total amounts of time that switches A and C, A and D, B and C, and B and D, respectively, are ON together in one switch cycle; $V_{AC}$, $V_{AD}$, $V_{BC}$, and $V_{BD}$ are the voltages across inductor 17 during times $t_{AC}$, $t_{AD}$, $t_{BC}$, and $t_{BD}$, respectively, in one switch cycle; and T is the period of one switching cycle.

The voltage across inductor 17 during each of the possible switch states is:

| Switch State | Inductor Voltage |
|---|---|
| Switches A and C ON | $V_{AC} = V_{IN}$ |
| Switches A and D ON | $V_{AD} = V_{IN} - V_{OUT}$ |
| Switches B and C ON | $V_{BC} = 0$ |
| Switches B and D ON | $V_{BD} = -V_{OUT}$ |
| Switches A and B ON | Disallowed |
| Switches C and D ON | Disallowed |

In a steady state, the average voltage across inductor 17 is zero ($\overline{V_{IND}}=0$). Thus, by setting equation (2) equal to zero, and by substituting the values from the above table, the steady state ratio of output voltage to input voltage can be expressed as:

$$\frac{V_{OUT}}{V_{IN}} = \frac{t_{AC} + t_{AD}}{t_{AD} + t_{BD}} = \frac{t_A}{t_D} \quad (3)$$

where $t_A$ represents the total time in one period T that switch A is ON, either in combination with switch C or D, and $t_D$ represents the total time in one period T that switch D is ON, either in combination with switch A or B. Equation (3) (which assumes ideal components such as switches A–D, diodes 32 and 34 in FIG. 3B, and inductor 17) verifies the ability of switching regulators of the present invention to regulate output voltages above, below, and substantially at the input voltage, depending on whether $t_A$ is greater than, less than, or substantially equal to $t_D$ during one switching cycle.

When switches A and B switch ON and OFF at switching frequency $f_S$, switch C remains OFF throughout each switching cycle T, and switch D remains ON throughout each switching cycle T ($t_D$=T), power supply 15 operates in buck mode. The duty cycle $D_A$ of switch A is $t_A/T$, which is less than 1 because switch A is ON for less than period T. From equation (3), the output-to-input voltage ratio can be expressed as follows:

$$\left(\frac{V_{OUT}}{V_{IN}}\right)\Bigg|_{BUCK} = \frac{t_A}{t_D} = \frac{t_A}{T} = D_A \quad (4)$$

Because $D_A$ is less than 1, $V_{OUT}$ is less than $V_{IN}$ in buck mode.

When switches C and D switch ON and OFF at switching frequency $f_S$, switch A is ON throughout each switching cycle T ($t_A$=T), and switch B is OFF throughout each switching cycle T, power supply 15 operates in boost mode. The duty cycle DD of switch D is $t_D/T$ which is less than 1 because switch D is ON for less than period T. From equation (3), the output-to-input voltage ratio can be expressed as follows:

$$\left(\frac{V_{OUT}}{V_{IN}}\right)\Bigg|_{BOOST} = \frac{t_A}{t_D} = \frac{T}{t_D} = \frac{1}{D_D} \quad (5)$$

Because $D_D$ is less than 1, $V_{OUT}$ is greater than $V_{IN}$ in boost mode.

If switches A, B, C, and D are ON for a period of time less than period T during each cycle of switching frequency $f_S$, power supply 15 operates in buck-boost mode. The duty cycle of each of the four switches is less than 1 (and greater than 0) because the switches are ON for less than period T in each cycle. In buck-boost mode, switching regulator 14 may regulate an output-to-input voltage ratio that is greater than 1, less than 1, or substantially equal to 1, as shown in equation (3), depending upon the relative on-times ($t_A$ and $t_D$) of switches A and D in each cycle. Thus, $V_{OUT}$ can be greater than, less than, or substantially equal to $V_{IN}$ in buck-boost mode.

Referring again to FIG. 2B, resistors 21A and 21B form a resistor divider between $V_{OUT}$ and GROUND. Error amplifier 22 has an inverting input coupled to the junction of resistors 21A and 21B, a non-inverting input coupled to a reference voltage $V_{REF}$, and an output terminal coupled to signal generator 24. Comparator 27 has an inverting input and a non-inverting input coupled to signal generator 24, and an output terminal coupled to logic circuitry 29. Comparator 28 has an inverting input and a non-inverting input coupled to signal generator 24, and an output terminal coupled to logic circuitry 29. Logic circuitry 29 provides four logic signals ($V_A$, $V_B$, $V_C$, and $V_D$) for driving switches A, B, C, and D.

Resistors 21A and 21B form a voltage divider that produces a voltage feedback signal $V_{FB}$ proportional to output voltage $V_{OUT}$. Error amplifier 22 amplifies the difference between $V_{REF}$ and $V_{FB}$ to produce control voltage $V_{CL}$. Control voltage $V_{CL}$ determines the duty cycle of the four switches. $V_{CL}$ varies inversely with $V_{OUT}$, which changes with load current or input voltage variations. Thus, $V_{CL}$ is coupled to $V_{OUT}$ indirectly through error amplifier 22 and the voltage divider.

Signal generator 24 generates two periodic waveforms $V_X$ and $V_Y$ that have the same frequency and period. Signal generator 24 generates waveform signal $V_X$, which is coupled to the inverting input of comparator 27. Signal generator 26 also generates waveform signal $V_Y$, which is coupled to the inverting input of comparator 28. The period of waveforms $V_X$ and $V_Y$ determines the period of the switching cycle. The periodic waveforms may be symmetric triangular waveforms as shown, for example, in FIG. 6A, or may be asymmetric sawtooth waveforms as shown, for example, in FIGS. 6B and 6C. Signal generator 24 also generates quasi-static signals $V_U$ and $V_V$ which are proportional to $V_{CL}$. Signal generator 24 generates $V_U$ at the non-inverting input of comparator 27, and $V_V$ at the non-inverting input of comparator 28.

Waveform signals $V_X$ and $V_Y$ or signals $V_U$ and $V_V$ (or both) differ by a direct current (DC) offset voltage $V_{DC}$. Signals $V_U$ and $V_V$, and waveforms $V_X$ and $V_Y$ determine whether the switching regulator operates in buck mode, boost mode, or buck-boost mode as discussed in further detail below with respect to FIGS. 6A–6C. Examples of signal generator 24 are shown and discussed with respect to FIGS. 2C, 7, and 8A.

Figure 6A:
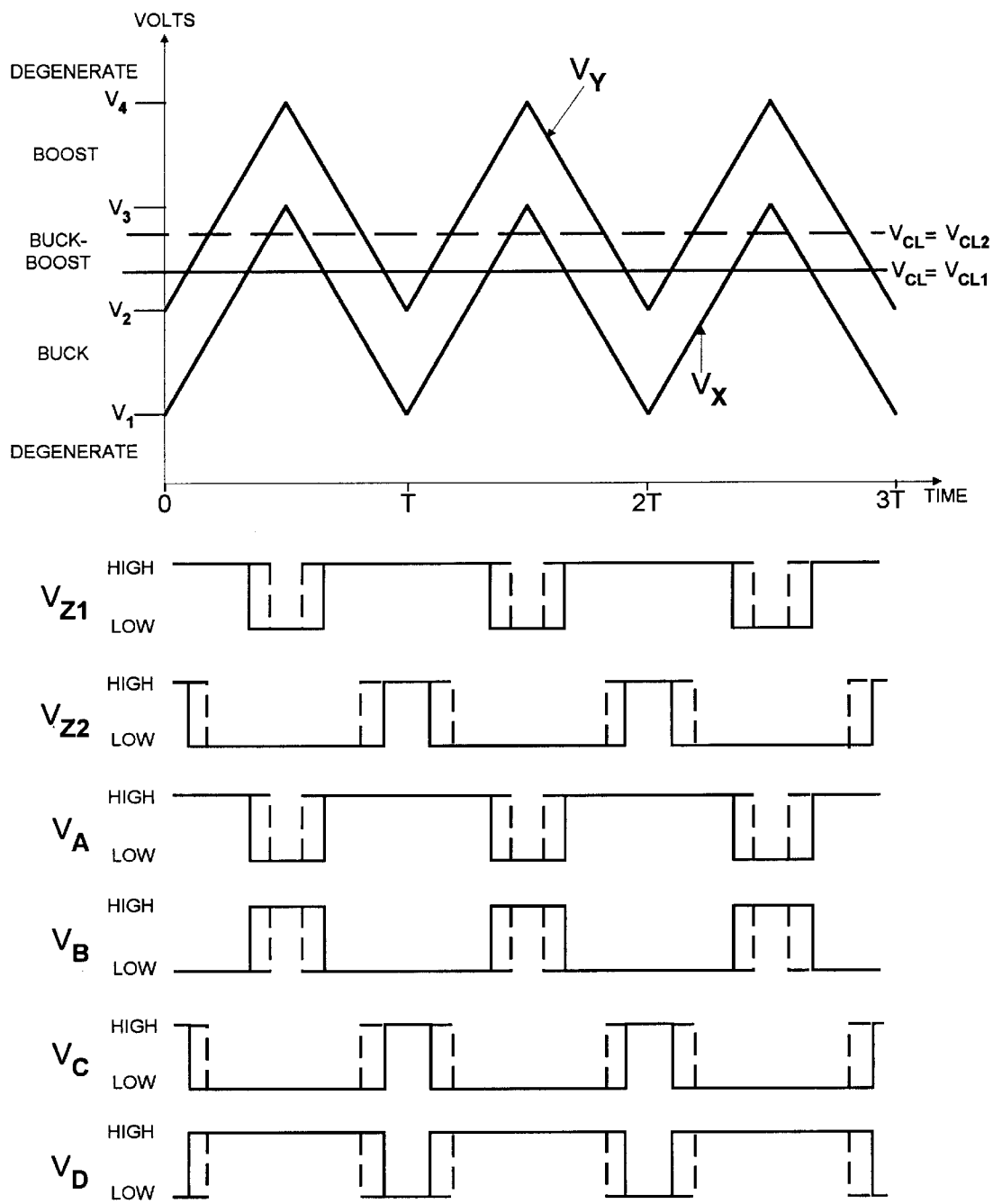
FIGS. 6A–6D are graphs of exemplary signals for the circuitry of FIGS. 2B, 3B, 4, and 5.

Referring again to FIG. 2B, comparator 27 compares waveform signal $V_X$ to $V_U$ to generate control signal $V_{Z1}$, which controls the switching of switches A and B. Comparator 28 compares waveform signal $V_Y$ to $V_V$ to generate control signal $V_{Z2}$, which controls the switching of switches C and D. FIG. 6A illustrates examples of waveform signals $V_X$ and $V_Y$ and control voltage $V_{CL}$, which is a quasi-static signal that varies with $V_{OUT}$. As shown in FIG. 6A, $V_X$ is a triangular waveform that has a period T, and that has minimum and maximum values of $V_1$ and $V_3$, respectively. $V_Y$ is a triangular waveform that has a period T, and that has minimum and maximum values of $V_2$ and $V_4$, respectively. As shown in FIG. 6A, $V_1 < V_2 < V_3 < V_4$. As described in more detail below, when $V_1 < V_{CL} < V_2$, regulator 14 controlled by control circuit 20 operates in buck mode, when $V_2 < V_{CL} < V_3$, regulator 14 controlled by control circuit 20 operates in buck-boost mode, and when $V_3 \leq V_{CL} < V_4$, regulator 14 controlled by control circuit 20 operates in boost mode. When $V_{CL} \leq V_1$ or $\leq V_4$, regulator 14 operates in a degenerate mode. As shown in FIG. 6A, waveforms $V_X$ and $V_Y$ are synchronized in phase, and have a DC offset difference $V_{DC}$ equal to $(V_2 - V_1) = (V_4 - V_3)$.

Logic circuitry 29 (FIG. 2B) generates drive signals $V_A$, $V_B$, $V_C$, and $V_D$. FIG. 6A illustrates examples of control signals $V_{Z1}$ and $V_{Z2}$, and drive signals $V_A$, $V_B$, $V_C$, and $V_D$ for $V_2 < V_{CL} < V_3$. With respect to FIGS. 6A–6D, 8B and 9C, switch A is ON when $V_A$ is HIGH and OFF when $V_A$ is LOW, switch B is ON when $V_B$ is HIGH and OFF when $V_B$ is LOW, switch C is ON when $V_C$ is HIGH and OFF when $V_C$ is LOW, and switch D is ON when $V_D$ if HIGH and OFF when $V_D$ is LOW, for purposes of illustration. Also with respect to FIGS. 6A–6D, 8B and 9C, $V_A = V_{Z1}$, $V_B = \overline{V_{Z1}}$, $V_C = V_{Z2}$, and $V_D = \overline{V_{Z2}}$ for purposes of illustration. Other relationships between $V_{Z1}$, $V_{Z2}$ and $V_A$, $V_B$, $V_C$, $V_D$ are also possible. For example, if the non-inverting input of comparator 27 is coupled to $V_X$ and the inverting input of comparator 27 is coupled to $V_U$, then $V_A = \overline{V_{Z1}}$ and $V_B = V_{Z1}$. Furthermore, if the non-inverting input of comparator 28 is coupled to $V_Y$ and the inverting input of comparator 28 is coupled to $V_V$, then $V_C = V_{Z2}$ and $V_D = \overline{V_{Z2}}$.

Figure 2C:
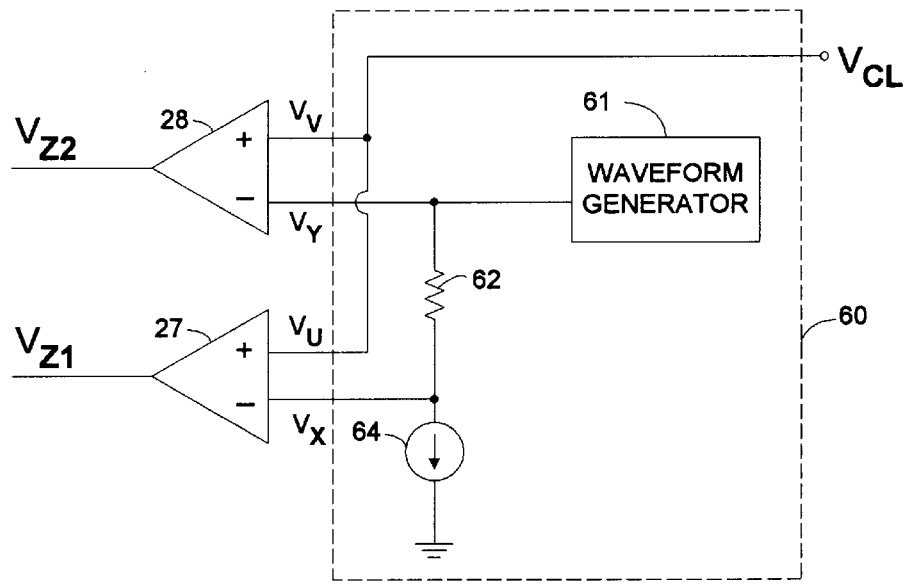
FIG. 2C is a block diagram of an illustrative embodiment of signal generators that may be used in control circuits of the present invention.

An example of signal modulator 24 for use in the present invention is shown in FIG. 2C. Signal generator 60 may be used as signal generator 24 in FIGS. 2B, 3B, 4, and 5. Signal generator 60 includes waveform generator 61, resistor 62, and constant current source 64. Waveform generator 61 generates periodic waveform $V_Y$, which is coupled to the inverting input of comparator 28. Control voltage $V_{CL}$ is coupled to the non-inverting inputs of comparators 27 and 28. Thus, $V_U$ and $V_V$ are equal to $V_{CL}$ in circuit 60. Control voltage $V_{CL}$ may be generated by error amplifier 22 that monitors voltage feedback $V_{FB}$ signal from the output voltage as shown, for example, in FIGS. 2B and 3B. The inverting input of comparator 28 is coupled to a first terminal of resistor 62.

Constant current source 64 is coupled between a second terminal of resistor 62 and GROUND, and conducts a constant current. The inverting input of comparator 27 is coupled to the second terminal of resistor 62. Comparators 28 and 27 provide outputs $V_{Z2}$ and $V_{Z1}$, respectively, that may be coupled to logic circuitry 29, 36, 46, or 56 of FIGS. 2B, 3B, 4 and 5, respectively. Comparator 27 generates control signal $V_{Z1}$ for controlling the switching of switches A and B (or just switch A in a non-synchronous embodiment). Comparator 28 generates control signal $V_{Z2}$ for controlling the switching of switches C and D (or just switch C in a non-synchronous embodiment).

Figure 6B:
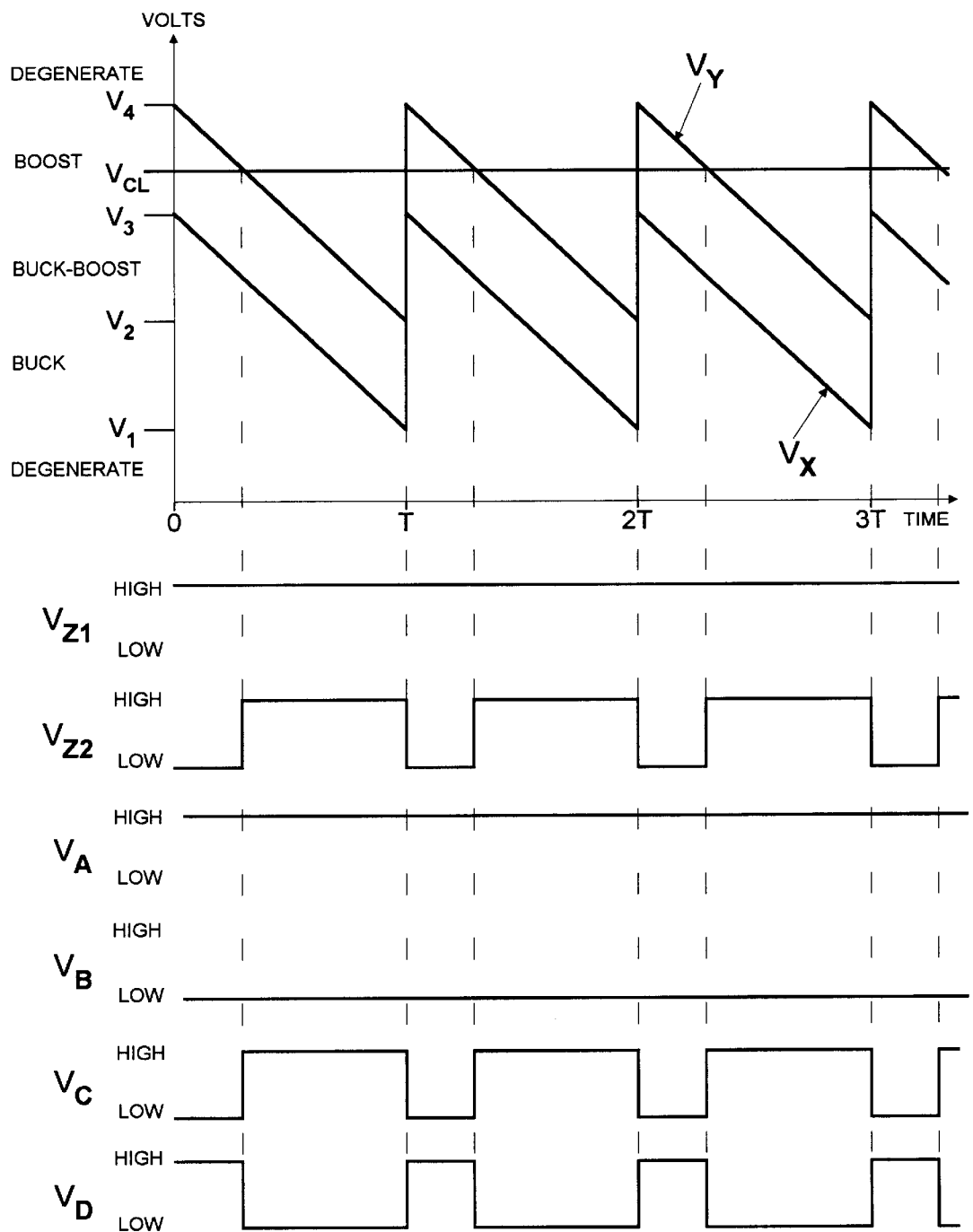
Figure 6C:
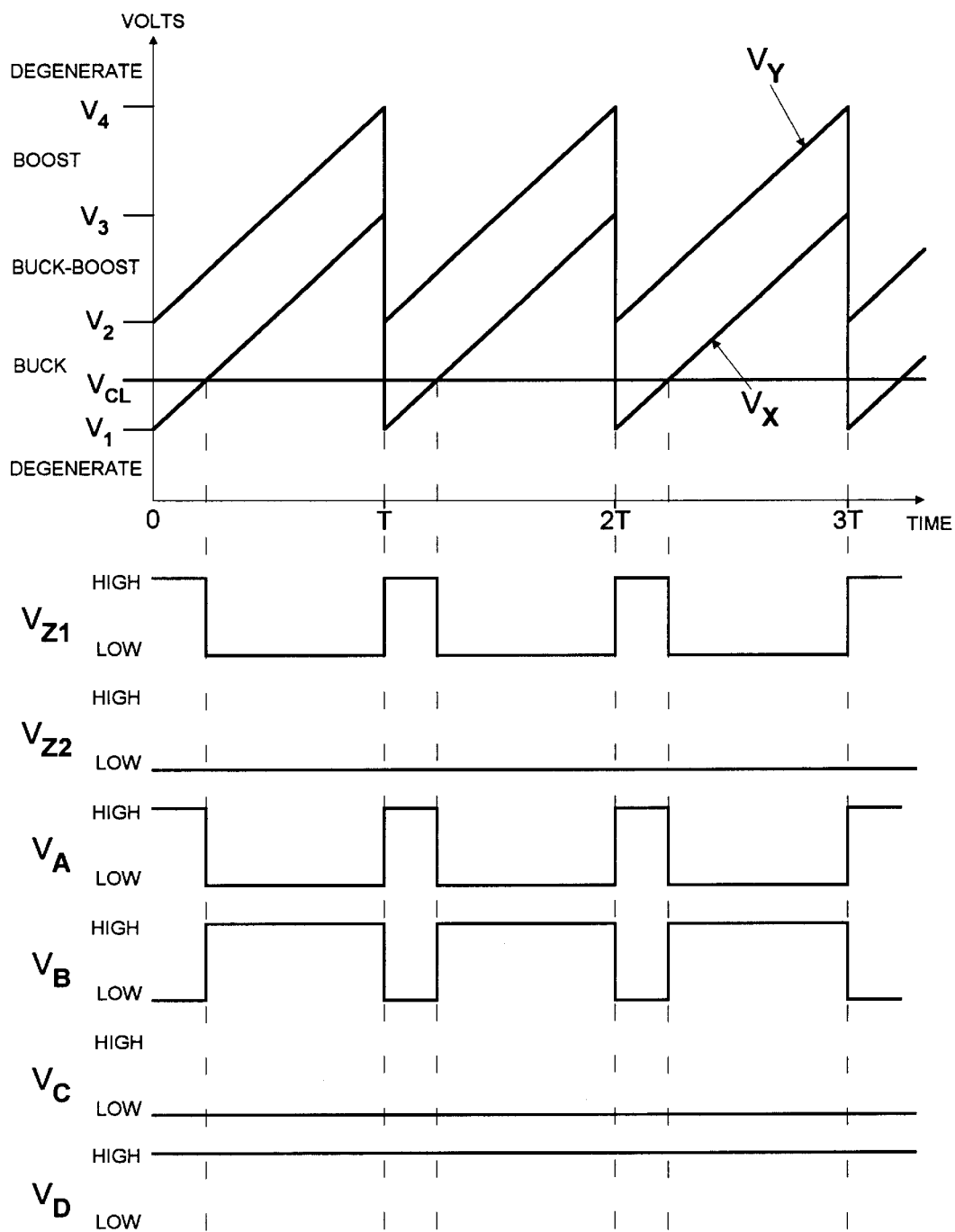

As shown in FIG. 2C, assuming that substantially no current flows into or out of the inverting inputs of comparators 27 and 28, signal $V_Y$ equals signal $V_X$, plus a constant negative DC offset that substantially equals the current conducted by constant current source 64 times the resistance of resistor 62. Examples of waveform signals $V_Y$ and $V_X$ generated by signal generator 60 are shown in FIGS. 6A–6C. Signals $V_X$ and $V_Y$ of signal generator 60 may not, however, equal signals $V_X'$ and $V_Y'$ in FIG. 6D because signals $V_X$ and $V_Y$ in circuit 60 have the same wave shape and the same peak-to-peak amplitude. Signals $V_X$ and $V_Y$ may be, for example, symmetric triangular waveforms or asymmetric sawtooth waveforms. The discussion below with respect to FIGS. 6A–6C applies to signal generator 60.

The overlap voltage $(V_3 - V_2)$ of signals $V_X$ and $V_Y$ may be expressed:

$$(V_3 - V_2) = V_{P-P} - (I_{64} \times R_{62}) \qquad (6)$$

where $V_{P-P}$ is the peak-to-peak amplitude of $V_Y$, $I_{64}$ is the current conducted by constant current source 64, and $R_{62}$ is the resistance of resistor 62. Signal $V_X$ has the same peak-to-peak amplitude and wave shape as signal $V_Y$.

In a further embodiment of the present invention, constant current source 64 of FIG. 2C may be replaced with a resistor so that signal $V_X$ has a varying voltage offset relative to signal $V_Y$. In this embodiment, signals $V_X$ and $V_Y$ have different peak-to-peak amplitudes.

Referring again to FIG. 2B, logic circuitry 29 includes drive circuitry for driving switches A, B, C, and D ON and OFF. When $V_{Z1}$ goes HIGH, logic circuitry 29 causes logic signal $V_A$ to go HIGH and logic signal $V_B$ to go LOW, turning ON switch A and turning OFF switch B. When $V_{Z1}$ goes LOW, logic circuitry 29 causes logic signal $V_A$ to go LOW and logic signal $V_B$ to go HIGH, turning OFF switch A and turning ON switch B. When $V_{Z2}$ goes HIGH, logic circuitry 29 causes logic signal $V_C$ to go HIGH and logic signal $V_D$ to go LOW, turning ON switch C and turning OFF switch D. When $V_{Z2}$ goes LOW, logic circuitry 29 causes $V_C$ to go LOW and $V_D$ to go HIGH, turning OFF switch C and turning ON switch D.

Figure 2D:
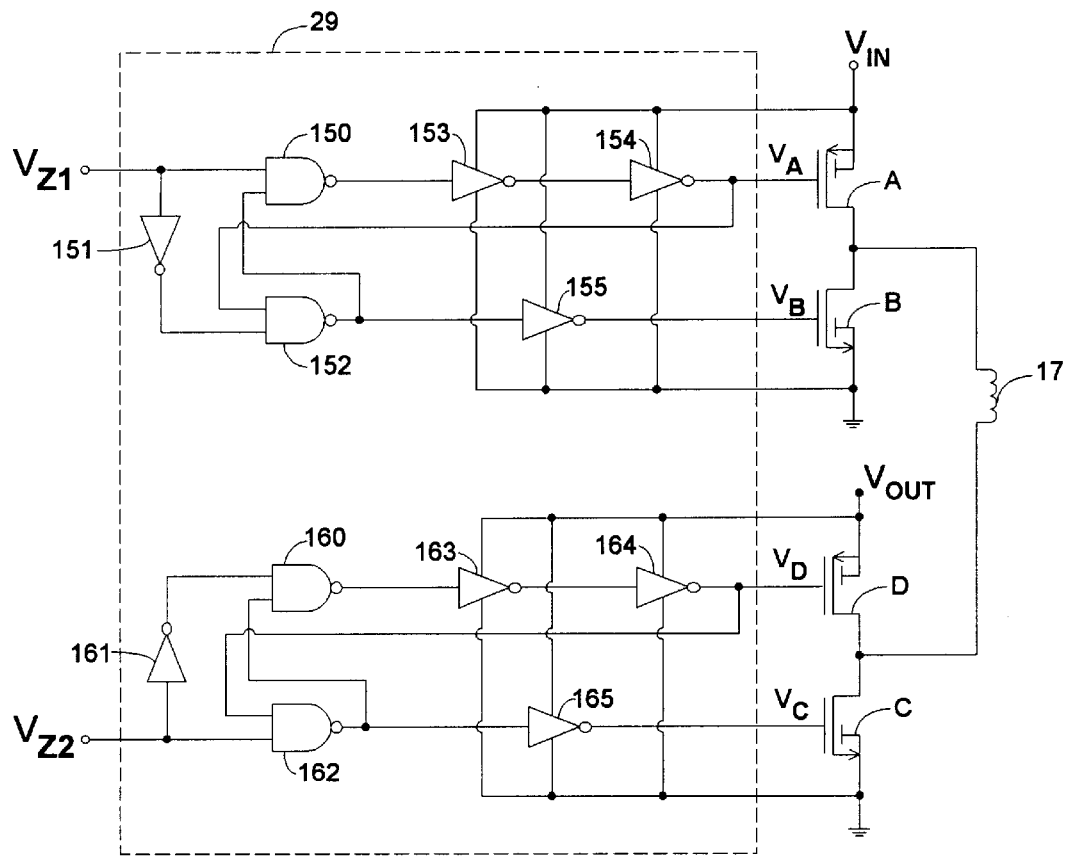
FIG. 2D is a schematic diagram of an illustrative embodiment of logic circuitry of the present invention.

An example of logic circuitry 29 for use in control circuit 20 is shown in FIG. 2D. Logic circuitry 29 has a plurality of logic gates including NAND gates 150, 152, 160, and 162; and inverters 151, 153, 154, 155, 161, 163, 164 and 165. In FIG. 2D, switches A and D are shown as P-channel field-effect transistors (FETs), and switches B and C are shown as N-channel FETs. With respect to FIG. 2D, switch A is ON when $V_A$ is LOW and OFF when $V_A$ is HIGH, switch B is ON when $V_A$ is HIGH and OFF when $V_A$ is LOW, switch C is ON when $V_C$ is HIGH and OFF when $V_C$ is LOW, and switch D is ON when $V_D$ is LOW and OFF when $V_D$ is HIGH. In a further embodiment of the present invention, switches A–D may all be N-channel FETs.

Inverters 153, 154, and 155 are coupled between $V_{IN}$ and GROUND. Inverters 163, 164, and 165 are coupled between $V_{OUT}$ and GROUND. Inverter 151 has an input coupled to $V_{Z1}$ and an output coupled to a first input of NAND gate 152. NAND gate 150 has a first input coupled to $V_{Z1}$, a second input coupled to the output of NAND gate 152, and an output coupled to an input of inverter 153. Inverter 153 has an output coupled to an input of inverter 154. Inverter 154 has an output coupled to a second input of NAND gate 152 and a gate of transistor A. NAND gate 152 has an output coupled to an input of inverter 155. Inverter 155 has an output coupled to a gate of transistor B. Inverter 161 has an input coupled to $V_{Z2}$ and a first input of NAND gate 162, and an output coupled to a first input of NAND gate 160. NAND gate 162 has an output coupled to a second input of NAND gate 160 and an input of inverter 165. Inverter 165 has an output coupled to a gate of transistor C. NAND gate 160 has an output coupled to an input of inverter 163. Inverter 163 has an output coupled to an input of inverter 164. Inverter 164 has an output coupled to a second input of NAND gate 162 and a gate of transistor D.

Logic circuitry 29 as shown in FIG. 2D prevents switches A and B from being ON at the same time, and prevents switches C and D from being ON at the same time by creating brief dead times between the ON times of switches A and B and the ON times of switches C and D. When $V_{Z1}$ is LOW, transistor A is OFF and transistor B is ON as shown, for example, in FIG. 6A. When $V_{Z1}$ goes HIGH, the output of inverter 151 goes LOW, then the output of NAND gate 152 goes HIGH, then the output of inverter 155 goes LOW turning OFF n-channel FET B. When the output of NAND gate 152 goes HIGH, the output of NAND gate 150 goes LOW, then the output of inverter 153 goes HIGH, then the output of inverter 154 goes LOW, turning ON p-channel FET A. The time it takes for the rising edge of $V_{Z1}$ to propagate through logic gates 151, 152, 150, 153, and then 154 to turn FET A ON is greater than the time it takes for the rising edge of $V_{Z1}$ to propagate through logic gates 151, 152, and then 155 to turn FET B OFF, because the signal has to pass through two more logic gates.

When $V_{Z1}$ transitions LOW, the output of NAND gate 150 goes HIGH, then the output of inverter 153 goes LOW, and then the output of inverter 154 goes HIGH, turning p-channel FET A OFF. When the output of inverter 154 goes HIGH and the output of inverter 151 is HIGH, the output of NAND gate 152 goes LOW, then the output of inverter 155 goes HIGH, turning ON n-channel FET B. The falling edge of $V_{Z1}$ passes through logic gates 150, 153, and then 154 to turn p-channel FET A OFF, and through logic gates 150, 153, 154, 152, and then 155 to turn n-channel FET B ON. Thus, it takes longer to turn FET B ON than it takes to turn FET A OFF on the falling edge of $V_{Z1}$. Therefore, brief dead times are created between the ON times of FETs A and B.

Logic gates 160–165 also create brief dead times between the ON times of FETs C and D to prevent these FETs from being ON at the same time. The rising edge of $V_{Z2}$ passes through four logic gates (161, 160, 163, and then 164) to turn p-channel FET D OFF, and through six logic gates (161, 160, 163, 164, 162, and then 165) to turn n-channel FET C ON. The falling edge of $V_{Z2}$ passes through two logic gates (162 and then 165) to turn n-channel FET C OFF, and through four logic gates (162, 160, 163, and then 164) to turn p-channel FET D ON.

Power supply 15 requires a lower average inductor current than prior art buck-boost switching regulators in which all four switches switch regardless of the input-output voltage relationship. The relationship between the average inductor current $\overline{I_{IND}}$ and the average output current $\overline{I_{OUT}}$ in power supply 15 may be expressed as:

$$\overline{I_{IND}} = \overline{I_{OUT}}\left[\frac{V_{OUT}}{V_{IN}} + \left(\frac{t_{BD}}{t_{BD} + t_{AD}}\right)\right] \qquad (7)$$

If $V_{IN}=V_{OUT}$ and $t_{AD}>0$, for example, average inductor current $\overline{I_{IND}}$ is less than twice the average output current. Time $t_{AD}$ is greater than zero in buck mode, boost mode, and buck-boost mode if DC offset voltage $V_{DC}$ (i.e., $(V_2-V_1)$ in FIGS. 6A–6D) between waveforms $V_Y$ and $V_X$ is greater than zero. Thus, power supply 15 requires lower average inductor current compared to buck-boost switching regulators with prior art control circuits if $V_{DC}>0$. If $V_{DC}$, and thus $t_{AD}$, equal zero, then the average inductor current in synchronous switching regulator 14 is defined by equation (1), as well as equation (7).

Figure 3A:
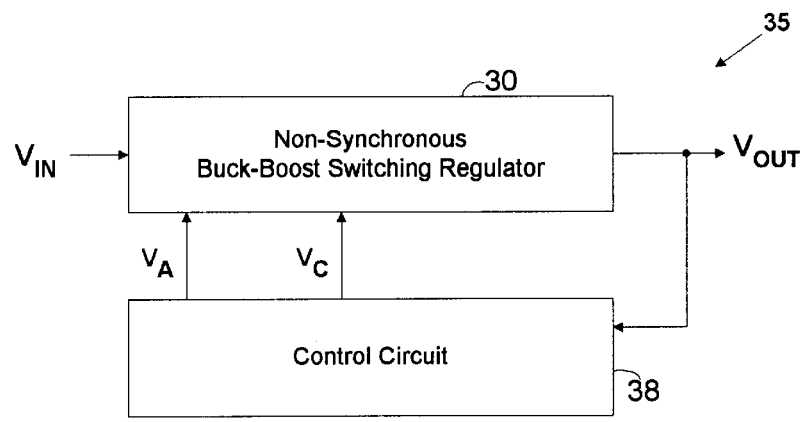
FIG. 3A is a block diagram of an illustrative embodiment of non-synchronous switching regulators with control circuits of the present invention.

Referring to FIG. 3A, another control circuit in accordance with this invention is described. Power supply 35 includes non-synchronous buck-boost switching regulator 30 and control circuit 38. Non-synchronous switching regulator 30 receives input voltage $V_{IN}$ and produces regulated output voltage $V_{OUT}$. Input voltage $V_{IN}$ may be higher, lower, or substantially the same as output voltage $V_{OUT}$. Control circuit 38 may operate switching regulator 30 in buck mode, boost mode, or buck-boost mode. Non-synchronous switching regulator 30 has two switches coupled between $V_{IN}$ and $V_{OUT}$ that control a supply of current to the output node at $V_{OUT}$ So that the output voltage may be maintained at the regulated value. Control circuit 38 receives output voltage $V_{OUT}$ and provides two drive signals ($V_A$ and $V_C$) that control the switching of the two switches in non-synchronous switching regulator 30.

Figure 3B:
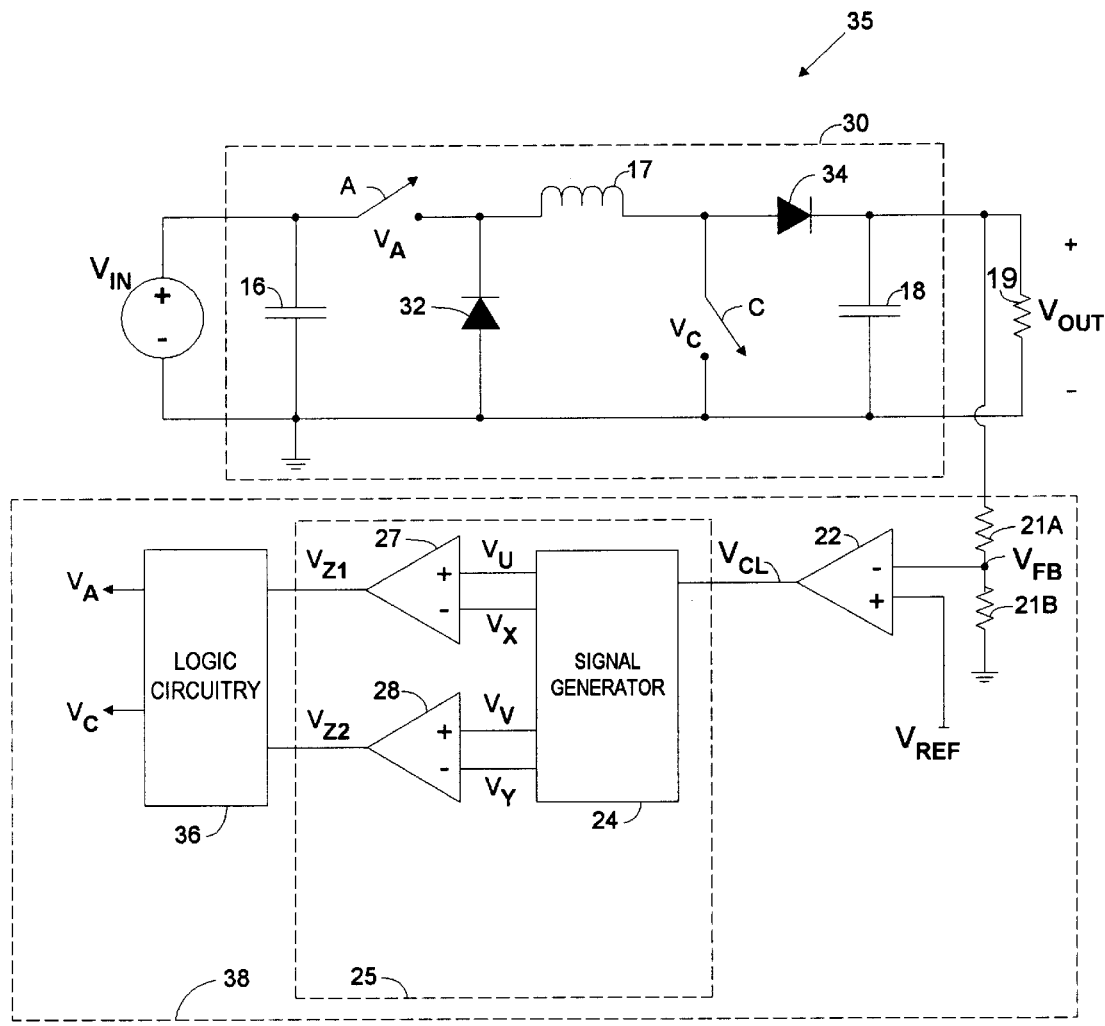
FIG. 3B is a schematic diagram of an illustrative embodiment of non-synchronous switching regulators with control circuits of the present invention.

Referring to FIG. 3B, a schematic diagram of power supply circuit 35 of the present invention is shown. Circuit 35 includes non-synchronous switching regulator 30 with two switches (A and C) and control circuit 38. In switching regulator 30, diodes 32 and 34 have replaced synchronous switches B and D, respectively, of FIG. 2B. Diode 32 has a cathode coupled to the second terminal of switch A and an anode coupled to GROUND. Diode 34 has a cathode coupled to capacitor 18 and an anode coupled to inductor 17.

Control circuit 38 of FIG. 3B is the same as control circuit 20 of FIG. 2B, except that logic circuitry 36 provides two drive signals ($V_A$ and $V_C$) to control switches A and C, respectively. When switch A is ON, diode 32 is reverse biased and conducts negligible current. When switch A is OFF diode 32 becomes forward biased and conducts current from GROUND through inductor 17. When switch C is ON, diode 34 is reverse biased and conducts negligible current. When switch C is OFF, diode 34 becomes forward biased and conducts current from inductor 17 to $V_{OUT}$.

Thus, when switches A and C are ON, diodes 32 and 34 are reverse biased, and current flows between $V_{IN}$ and GROUND through inductor 17. When switch A is ON and switch C is OFF, diode 32 is reverse biased, diode 34 is forward biased, and current flows between $V_{IN}$ and $V_{OUT}$ through inductor 17. When switches A and C are OFF, diodes 32 and 34 are forward biased, and current flows between GROUND and $V_{OUT}$ through inductor 17. When switch A is OFF and switch C is ON, diode 32 is forward biased, diode 34 is reverse biased, and the current through inductor 17 does not change because both its terminals are coupled to GROUND. Control circuit 38 of FIG. 3B may operate non-synchronous switching regulator 30 in buck mode, boost mode, or buck-boost mode depending upon the value of $V_{CL}$ as discussed with respect to FIGS. 6A–6D.

Figure 4:
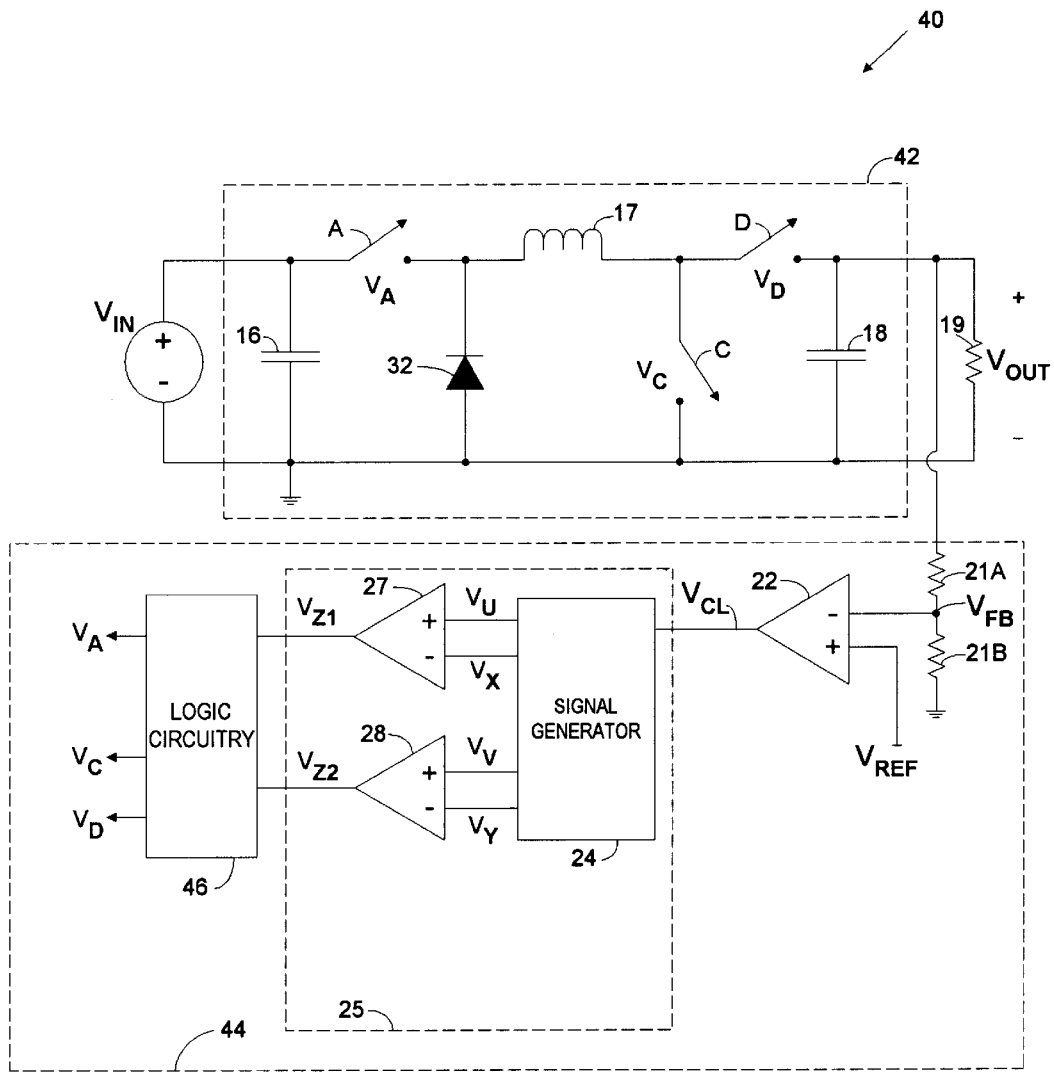
FIG. 4 is a schematic diagram of an illustrative embodiment of synchronous/non-synchronous switching regulators with control circuits of the present invention.

Referring to FIG. 4, another control circuit in accordance with this invention is described. Power supply 40 includes switching regulator 42 that has non-synchronous switch A, diode 32, and synchronous switches C and D. Control circuit 44 of FIG. 4 is the same as control circuit 20 of FIG. 2B, except that logic circuitry 46 outputs three drive signals ($V_A$, $V_C$ and $V_D$) to control switches A, C, and D, respectively. In control circuit 44, comparator 27 controls the switching of switch A, and comparator 28 controls the switching of switches C and D. Depending upon the value of $V_{CL}$, control circuit 44 of the present invention may operate switching regulator 42 in buck mode, boost mode, or buck-boost mode, in the same manner as discussed with respect to FIGS. 6A–6D.

Figure 5:
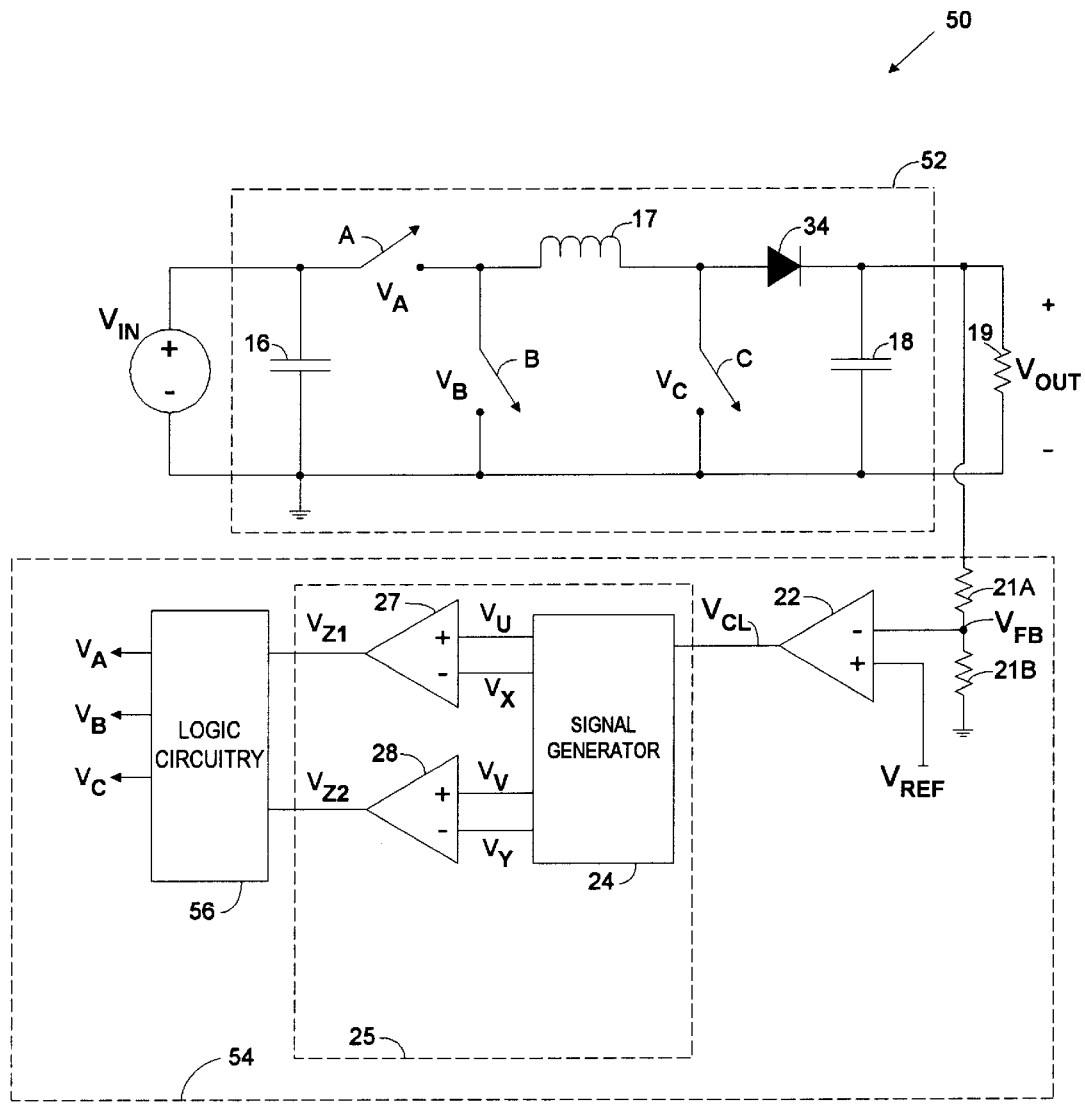
FIG. 5 is a schematic diagram of another illustrative embodiment of synchronous/non-synchronous switching regulators with control circuits of the present invention.

FIG. 5 illustrates another example of a buck-boost switching regulator with two synchronous switches, a non-synchronous switch, and a diode. Power supply 50 of FIG. 5 has switching regulator 52, and control circuit 54. Switching regulator 52 has synchronous switches A and B, diode 34, and non-synchronous switch C. Control circuit 54 is the same as control circuit 20 of FIG. 2B, except that logic circuitry 56 outputs only three drive signals ($V_A$, $V_B$ and $V_C$) to control switches A, B, and C, respectively. In control circuit 54, comparator 27 controls the switching of switches A and B, and comparator 28 controls the switching of switch C. Control circuit 54 of the present invention may operate switching regulator 52 in buck mode, boost mode, or buck-boost mode in the same manner as discussed with respect to FIGS. 6A–6D.

Signal generator 24 generates waveform signals $V_X$ and $V_Y$, and quasi-static signals $V_U$ and $V_V$ for control circuits 20, 38, 44 and 54. Waveforms $V_X$ and $V_Y$ shown in FIGS. 6A–6C (as well as $V_X{}'$ and $V_Y{}'$ in FIG. 6D) may be used with power supplies 15, 35, 40, and 50. FIGS. 6A–6D illustrate four examples of periodic waveforms with period T that may be used in switching regulator circuits of the present invention. Other types of periodic waveforms also may be used such as asymmetrical sawtooth waveforms with non-rapidly rising and falling edges.

FIGS. 6A–6D also show examples of control voltage $V_{CL}$, control signals $V_{Z1}$ and $V_{Z2}$, and drive signals $V_A$, $V_B$, $V_C$, and $V_D$ during the three modes of operation (buck, boost, and buck-boost). The value of $V_{CL}$ determines the active steady state operating mode. With respect to FIGS. 6A–6D, $V_U$ and $V_V$ both equal $V_{CL}$ throughout each period T as shown, for example, in FIGS. 2C and 7. Also with respect to FIGS. 6A–6D, $V_{DC}$ equals $(V_2-V_1)=(V_4-V_3)$. The three steady state operating modes are referred to as buck ($V_1<V_{CL}<V_2$), buck-boost ($V_2<V_{CL}<V_3$), and boost ($V_3<V_{CL}<V_4$) With respect to the discussion below regarding FIGS. 6A–6D, diode 32 in regulators 30 and 42 is forward biased when switch B is indicated as being ON, and reverse biased when switch B is indicated as being OFF. Furthermore, diode 34 in regulators 30 and 52 is forward biased when switch D is indicated as being ON and reverse biased when switch D is indicated as being OFF.

FIG. 6A illustrates exemplary waveforms $V_X$ and $V_Y$ and signals $V_{Z1}$ $V_{Z2}$, $V_A$, $V_B$, $V_C$ and $V_D$ for two values of control voltage $V_{CL}$ ($V_{CL1}$ and $V_{CL2}$). The operating mode of switching regulator circuits of this invention is determined by the value of control voltage $V_{CL}$ and voltage levels $V_1$, $V_2$, $V_3$, and $V_4$. Waveforms $V_X$ and $V_Y$ are symmetrical triangular waveforms with period T. The values of signals $V_{Z1}$, $V_{Z2}$, $V_A$, $V_B$, $V_C$, and $V_D$ are shown by solid lines for $V_{CL}=V_{CL1}$, are shown by dotted lines for $V_{CL}=V_{CL2}$.

FIG. 6A shows an example of the present invention in buck-boost mode. As shown in FIG. 6A, when $V_X$ and $V_Y$ are both below $V_{CL}$, signals $V_{Z1}$ and $V_{Z2}$ are HIGH, signals $V_A$ and $V_C$ are HIGH (switches A and C ON) and signals $V_B$ an $V_D$ are LOW (switches B and D OFF). When $V_Y$ is above $V_{CL}$ and $V_X$ is below $V_{CL}$, $V_{Z1}$ is HIGH, $V_{Z2}$ is LOW, $V_A$ and $V_D$ are HIGH (switches A and D ON), and $V_B$ and $V_C$ are LOW (switches B and C OFF). When $V_X$ and $V_Y$ are both above $V_{CL}$, $V_{Z1}$ and $V_{Z2}$ are LOW, $V_B$ and $V_D$ are HIGH (switches B and D ON), and $V_A$ and $V_C$ are LOW (switches A and C OFF). In buck-boost mode, power is required to drive all of the switches ON and OFF during every period T.

If the output-to-input voltage ratio of regulator circuits 14, 30, 42 or 52 changes, the on-times of switches A, B, C and D (and/or diodes 32 and 34) correspondingly change. For example, in power supply circuit 15 of FIG. 2B, if $V_{IN}$ decreases in buck-boost mode, the output-to-input voltage ratio increases. If $V_{IN}$ decreases, error amplifier 22 senses a slight decrease in $V_{OUT}$, because less current flows to load 19 in each period T for a given duty cycle of the switches. As $V_{OUT}$ decreases, $V_{CL}$ increases. As can be seen in FIG. 6A, as $V_{CL}$ increases to $V_{CL2}$, the off-time of $V_{Z1}$ decreases and the on-time of $V_{Z2}$ increases, which increases the on-times of switches A and C, and decreases the on-times of switches B and D. Thus, control circuits of the present invention adjust the duty cycle of the switches to maintain $V_{OUT}$ at the regulated value. This duty cycle satisfies the relationship in equation (3) assuming ideal components.

In accordance with this invention, the range of output-to-input voltage ratios for which the switching regulator operates in buck-boost mode depends on the voltage overlap of waveforms $V_X$ and $V_Y$. As shown in FIGS. 6A–6D, the voltage overlap of $V_X$ and $V_Y$ is the region ($V_3-V_2$). As the voltage overlap increases, the range of output-to-input voltage ratios for which control circuits of the present invention operate the switching regulator in buck-boost mode increases. As the voltage overlap decreases, the range of output-to-input voltage ratios for which control circuits of the present invention operate the switching regulator in buck-boost mode decreases.

At maximum overlap (i.e., $V_{DC}=0$, such that $V_1=V_2$, and $V_3=V_4$), the control circuit operates the switching regulator in buck-boost mode for all output-to-input voltage ratios. In this case, the switches A and D are never ON together, and the switching sequence is A and C ON, B and D ON, A and C ON, B and D ON, etc.

Maximum overlap has several disadvantages. First, the average inductor current is larger for a given output current and output-to-input voltage ratio because $t_{AD}$ equals zero as shown in equation (7). Secondly, the switching regulator is inefficient because all of the switches are turned ON and OFF in every period T regardless of the output-to-input voltage ratio. Therefore, any overlap less than the maximum overlap condition ($V_{DC}$>0) allows the switching regulator to operate in buck, boost, and buck-boost modes thereby improving efficiency and reducing inductor current.

If $V_X$ and $V_Y$ do not overlap at all (i.e., $V_3 \leq V_2$), then the switching regulator never operates in buck-boost mode. In this situation, if $V_{CL}$ is greater than $V_3$ but less than $V_2$, no switching occurs because switches A and D are ON throughout the duration of each period T, and the input and output nodes are coupled through the inductor ($V_{IN}=V_{OUT}$). In this case, output voltage $V_{OUT}$ is no longer being regulated to a constant value. Buck mode and boost mode still exist when $V_{CL}$ intersects one or the other of the waveforms.

The voltage overlap ($V_3-V_2$) can be used to adjust the desired behavior of the switching regulator. If maximum efficiency is desired, the waveforms should not be overlapped at all (so that the voltage overlap is less than or equal to zero, i.e., $V_3<V_2$) to eliminate operation in buck-boost mode. However, in this situation, there is a region of operation where $V_{CL}$ will not have any control over the output-to-input voltage ratio. This occurs when the input voltage substantially equals the output voltage. If the system is implemented as in FIG. 2B, but with the waveforms non-overlapped (i.e., $V_3 \leq V_2$), and with $V_{OUT}=V_{IN}$, $V_{CL}$ will rapidly shift between buck mode and boost mode trying to find a constant duty cycle for the switches. Output-to-input voltage ratios near unity will not always have a single control voltage level that can accommodate that condition. Therefore, the system behaves hysteretically as it shifts between buck mode and boost mode, which is typically undesirable.

As the voltage overlap ($V_3-V_2$) increases above zero, the range of input voltages over which the regulator operates in the relatively inefficient buck-boost mode increases, but the hysteretic mode discussed above with respect to the transition between buck and boost modes is eliminated. This results in poorer efficiency over a larger range of output-to-input voltage ratios, but improved transient behavior. Furthermore, a voltage overlap ($V_3-V_2$) greater than zero guarantees that any output-to-input voltage ratio can be maintained with a constant duty cycle of the switches (for a constant load current).

FIG. 6B illustrates alternative waveforms $V_X$ and $V_Y$ in which $V_3 \leq V_{CL} < V_4$, and therefore the regulator operates in boost mode. Waveforms $V_X$ and $V_Y$ in FIG. 6B are sawtooth waveform signals with rapidly rising edges and a period T. As long as $V_{CL}$ is not less than $V_3$, $V_{CL}$ is always greater than waveform $V_X$, and $V_{Z1}$ is HIGH during the entire period T of each switching cycle. Thus, in boost mode, $V_A$ is HIGH and switch A is ON, and $V_B$ is LOW and switch B is OFF for the entire period T of each switching cycle. Comparator 28 controls the ON and OFF switching of switches C and D in boost mode in power supplies 15 and 40 and the ON and OFF switching of switch C in boost mode in power supplies 35 and 50. When $V_Y$ is above $V_{CL}$, $V_{Z2}$ is LOW and $V_D$ is HIGH, so that switch D is ON, and $V_C$ is LOW so that switch C is OFF. When $V_Y$ is below $V_{CL}$, $V_{Z2}$ is HIGH, $V_C$ is HIGH so that switch C is ON, and $V_D$ is LOW so that switch D is OFF.

FIGS. 6A and 6B illustrate examples of waveforms $V_X$ and $V_Y$ that have the same peak-to-peak amplitudes. If the peak-to-peak amplitudes of $V_X$ in FIGS. 6A and 6B are the same, the peak-to-peak amplitudes of $V_Y$ in FIGS. 6A and 6B are the same, and the voltage overlap ($V_3-V_2$) in FIGS. 6A and 6B is the same, then times $t_{AD}$, $t_{BD}$, and $t_{AC}$ are the same for a given $V_{CL}$ in these two embodiments in a steady state condition, even though the shapes of $V_X$ and $V_Y$ in FIG. 6A (triangular) differ from $V_X$ and $V_Y$ in FIG. 6B (sawtooth). Also, the steady state output-to-input voltage ratio is the same for FIGS. 6A and 6B in this instance, since only the on-times of switches A and D are relevant in determining the steady state output-to-input voltage ratio as shown in equation (3). The sequence of the ON times of the switches of these two embodiments are different. In FIG. 6A, the repeating switching sequence in buck-boost mode is AD ON, BD ON, AD ON, AC ON, etc. In FIG. 6B, the repeating switching sequence in buck-boost mode is AD ON, AC ON, BD ON, etc.

FIG. 6C illustrates additional alternative waveforms $V_X$ and $V_Y$ in which $V_1 < V_{CL} < V_2$, and therefore the regulator operates in buck mode. Waveforms $V_X$ and $V_Y$ in FIG. 6C are sawtooth waveform signals with rapidly falling edges and a period T. If $V_{CL}$ does not exceed $V_2$, waveform $V_Y$ is always greater than $V_{CL}$, and $V_{Z2}$ in power supplies 15, 35, 40, and 50 is LOW during the entire period T of each switching cycle. Thus, $V_C$ is LOW causing switch C to be OFF for the full period T of each cycle, and $V_D$ is HIGH causing switch D to be ON for the full period T of each cycle in buck mode. Comparator 27 controls the ON and OFF switching of switches A and B in buck mode in power supplies 15 and 50 and the ON and OFF switching of switch A in buck mode in power supplies 35 and 40. When $V_X$ is above $V_{CL}$, $V_{Z1}$ is LOW, $V_B$ is HIGH so that switch B is ON, and $V_A$ is LOW so that switch A is OFF. When $V_X$ is below $V_{CL}$, $V_{Z1}$ is HIGH, $V_A$ is HIGH so that switch A is ON, and $V_B$ is LOW so that switch B is OFF.

Figure 6D:
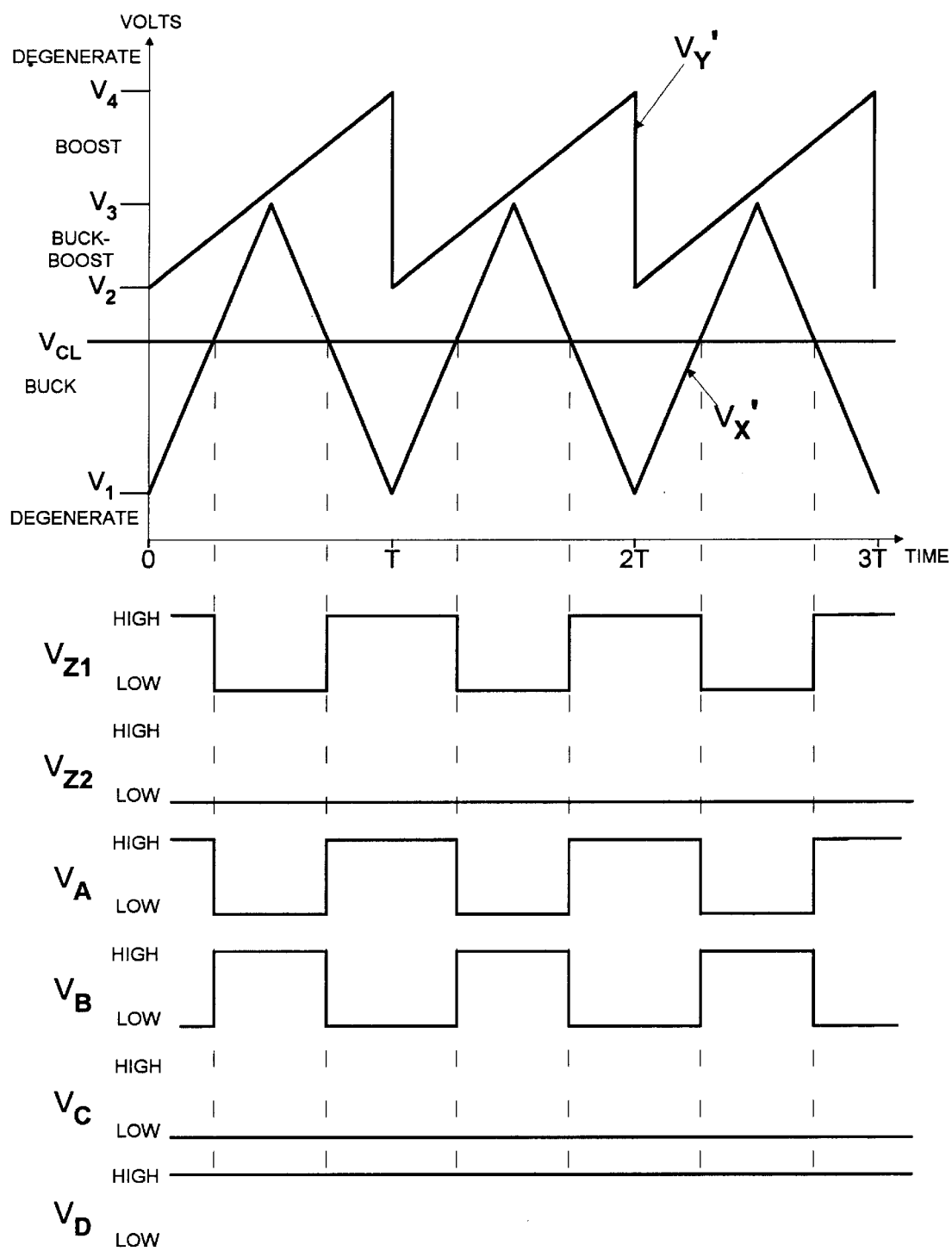

FIG. 6D illustrates examples of other waveforms signals $V_X'$ and $V_Y'$ that may be used in control circuits of the present invention. Signal generator 24 may generate waveform signals $V_X'$ and $V_Y'$ in place of waveform signals $V_X$ and $V_Y$, respectively. The waveform signals generated by signal generator 24 do not have to be identical, or even have the same wave shape. As shown in FIG. 6D, $V_X'$ is a symmetrical triangular waveform, and waveform $V_Y'$ is an asymmetrical sawtooth waveform. Both waveforms have a period T. The peak-to-peak amplitude of $V_X'$ ($V_3-V_1$) is greater than the peak-to-peak amplitude of $V_Y'$ ($V_4-V_2$).

A buck-boost switching regulator controlled by control circuits of the present invention with waveforms $V_X'$ and $V_Y'$ in FIG. 6D may operate in buck mode, boost mode, or buck-boost mode as discussed above with respect to FIGS. 6A–6C. Equation (3) also applies to control circuits of the present invention that have waveforms $V_X'$ and $V_Y'$ with different wave shapes and different peak-to-peak amplitudes. Preferably, waveforms $V_X'$ and $V_Y'$ are chosen so that they do not cross each other so that switches B and C are never ON at the same time (i.e., when $V_{CL} > V_Y'$ and $< V_X'$)

Referring to FIGS. 6A–6D, two "degenerate" modes are shown. The degenerate modes occur if control voltage $V_{CL}$ is less than or equal to $V_1$ or if $V_{CL}$ is greater than or equal to $V_4$. If $V_{CL}$ is less than or equal to $V_1$, both $V_{Z1}$ and $V_{Z2}$ remain LOW, and switches B and D are ON throughout period T of each cycle (if $V_A=V_{Z1}$, $V_B=\overline{V_{Z1}}$, $V_C=V_{Z2}$, and $V_D=\overline{V_{Z2}}$). This mode discharges the output voltage to GROUND through inductor 17. In the second degenerate mode, $V_{CL}$ is greater than or equal to $V_4$, both $V_{Z1}$ and $V_{Z2}$ remain HIGH, and switches A and C are ON throughout period T of each cycle (if $V_A=V_{Z1}$, $V_B=\overline{V_{Z1}}$, $V_C=V_{Z2}$, and $V_D=\overline{V_{Z2}}$). This mode shorts the input voltage to GROUND through inductor 17 which is typically undesirable. The degenerate modes are not used to regulate $V_{OUT}$. Both of these modes are only considered degenerate when switches A and C are ON together for the entire duration of period T, or switches B and D are ON together for the entire duration of period T.

Figure 7:
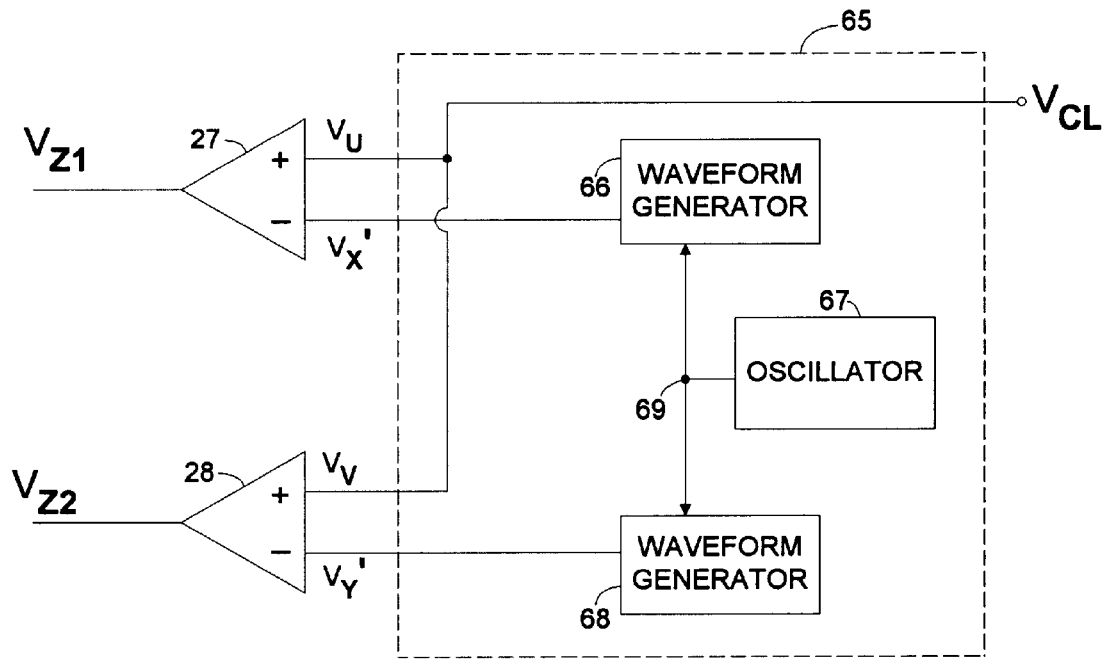
FIG. 7 is a block diagram of another illustrative embodiment of signal generators that may be used in control circuits of the present invention.

An example of signal generator 24 that can generate waveforms $V_X'$ and $V_Y'$ that have different wave shapes and different peak-to-peak amplitudes is shown in FIG. 7. Signal generator 65 may be used as signal generator 24 in FIGS. 2B, 3B, 4, and 5. Signal generator 65 includes waveform generators 66 and 68, and oscillator 67. In circuit 65, signals $V_U$ and $V_V$ are generated at the non-inverting inputs of comparators 27 and 28, respectively. Signals $V_U$ and $V_V$ are equal to $V_{CL}$ in FIG. 7. Waveform generator 66 generates waveform $V_X'$ at the inverting input of comparator 27 and waveform generator 68 generates waveform $V_Y'$ at the inverting input of comparator 28. Waveforms $V_X'$ and $V_Y'$ may have different wave shapes and different peak-to-peak amplitudes as shown, for example, in FIG. 6D. Oscillator 67 generates a periodic signal at node 69 that is received by waveform generators 66 and 68. The periodic signal at node 69 synchronizes the periods T of waveforms $V_X'$ and $V_Y'$ so that their periods begin and end at the same time. For example, waveform generators 66 and 68 may begin the period of waveforms $V_X'$ and $V_Y'$, respectively, on the rising edge of a digital signal at node 69. If desired, waveforms $V_X'$ and $V_Y'$ in FIG. 7 may have the same wave shape and the same peak-to-peak amplitude, with a DC offset voltage $V_{DC} = (V_2 - V_1) = (V_4 - V_3)$.

Figure 8A:
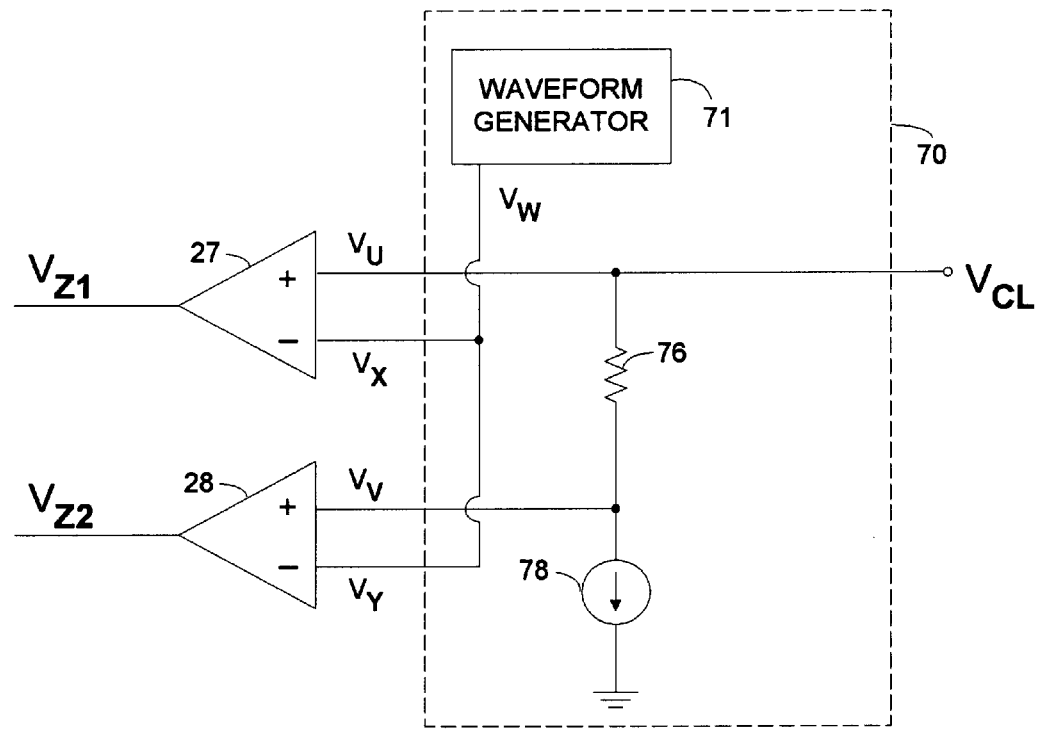
FIG. 8A is a block diagram of another illustrative embodiment of signal generators that may be used in control circuits of the present invention.

A further embodiment of a signal generator in accordance with the present invention is illustrated in FIG. 8A. Control circuits with the signal generator of FIG. 8A also may be used to generate control signals for synchronous, non-synchronous, and synchronous/non-synchronous buck-boost switching regulators. Signal generator 70 in FIG. 8A may be used in place of signal generator 24 in FIGS. 2B, 3B, 4, and 5. Signal generator 70 includes waveform generator 71, resistor 76, and constant current source 78. Waveform generator 71 generates periodic waveform $V_W$ at the inverting inputs of comparators 27 and 28. Waveform $V_W$ equals $V_X$ and $V_Y$. Control voltage $V_{CL}$ may be generated from error amplifier 22 that monitors voltage feedback signal $V_{FB}$ as shown, for example, in FIGS. 2B and 3B. $V_{CL}$ is coupled to the non-inverting input of comparator 27 (so that $V_U$ equals $V_{CL}$) and to a first terminal of resistor 76. Constant current source 78 is coupled between a second terminal of resistor 76 and GROUND and conducts a constant current. The non-inverting input of comparator 28 is coupled to the second terminal of resistor 76. Comparator 27 generates control signal $V_{Z1}$ for controlling the switching of switches A and B or just switch A in a non-synchronous embodiment. Comparator 28 generates control signal $V_{Z2}$ for controlling the switching of switches C and D or just switch C in a non-synchronous embodiment.

Signal generator 70 generates voltage $V_V$ at the non-inverting input of comparator 28 which is offset negatively from $V_{CL}$ and $V_U$ by a constant value. Assuming that no current flows into or out of the non-inverting inputs of comparators 27 and 28, the constant offset between $V_U$ and $V_V$ equals the current conducted by constant current source 78 times the resistance of resistor 76. $V_V$ may be expressed as:

$$V_V = V_U - (I_{78} \times R_{76}) \qquad (8)$$

where $I_{76}$ is the current conducted by constant current source 78 and $R_{76}$ is the resistance of resistor 76. Thus, offset voltage $V_{DC}$ equals $V_U - V_V$ with respect to the embodiment of FIGS. 8A–8B.

Figure 8B:
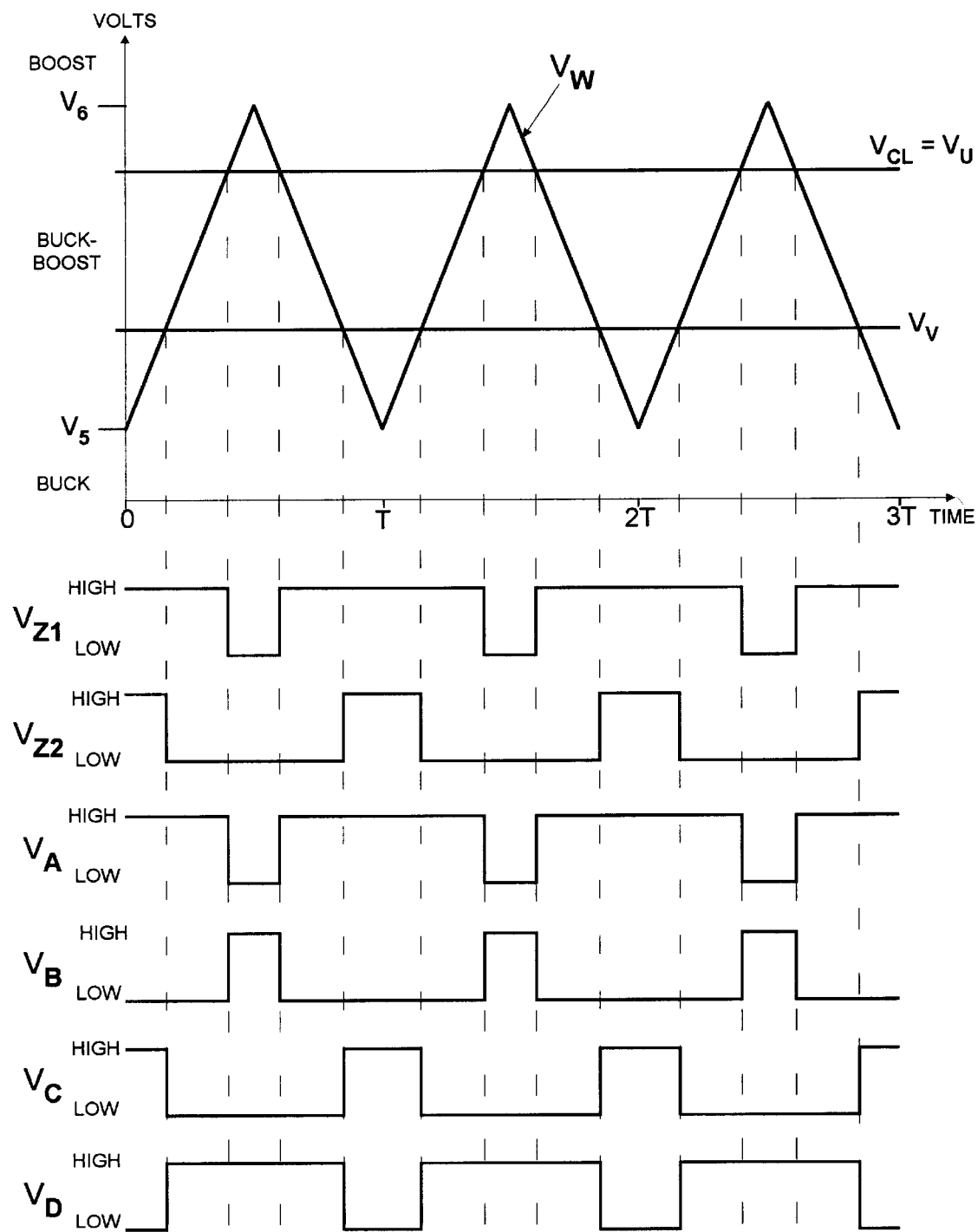
FIG. 8B is a graph of exemplary signals for control circuits of the present invention with the circuitry of FIG. 8A.

An example of signal $V_W$ generated by waveform generator 71 is shown in FIG. 8B. Signal $V_W$ has a maximum value of $V_6$ and a minimum value of $V_5$. Examples of signals $V_U$, $V_V$, $V_{Z1}$, $V_{Z2}$, $V_A$, $V_B$, $V_C$, and $V_D$ are also shown in FIG. 8B. The switching regulator controlled by a control circuit with signal generator 70 operates in buck-boost mode when $V_U$ and $V_V$ are both less than $V_6$ and greater than $V_5$. In buck-boost mode, control signals $V_{Z1}$ and $V_{Z2}$ control the ON and OFF switching of each of the switches in every period T.

If $V_U$ equals or exceeds $V_6$ and $V_V$ is less than $V_6$, the switching regulator controlled by signal generator 70 operates in boost mode because $V_{Z1}$ and $V_A$ are HIGH, $V_B$ is LOW, and switch A is ON and switch B is OFF for the entire duration of each cycle. Control signal $V_{Z2}$ controls the ON and OFF switching of switches C and D in boost mode. If $V_V$ is less than or equal to $V_5$ and $V_U$ is greater than $V_5$, the switching regulator controlled by the signal generator 70 operates in buck mode because $V_{Z2}$ and $V_C$ are LOW, $V_D$ is HIGH, and switch C is OFF and switch D is ON for the entire duration of each cycle. Control signal $V_{Z1}$ controls the ON and OFF switching of switches A and B in buck mode. Referring to FIG. 8B, switch A is ON when $V_W$ is below $V_U$ and OFF when $V_W$ is above $V_U$. Switch B is ON when $V_W$ is above $V_U$ and OFF when $V_W$ is below $V_U$. Switch C is ON when $V_W$ is below $V_V$ and OFF when $V_W$ is above $V_V$. Switch D is ON when $V_W$ is above $V_V$ and OFF when $V_W$ is below $V_V$. When $V_U$ and $V_V \geq V_6$ or when $V_U$ and $V_V \leq V_5$, the switching regulator operates in a degenerate mode.

In a further embodiment of the present invention, constant current source 78 may be replaced with a resistor to generate $V_V$ so that $V_V$ is a fraction of $V_{CL}$ and $V_U$. In this embodiment, the offset voltage between $V_U$ and $V_V$ varies as $V_{CL}$ increases and decreases.

The propagation delay of a comparator is the time required for its output signal to reach one half of the supply voltage from the time when its differential input voltage passes through zero. There are two distinct propagation delays: $t_{PLH}$ is the propagation delay when the output of the comparator transitions from LOW to HIGH, and $t_{PHL}$ is the propagation delay when the output of the comparator transitions from HIGH to LOW. The propagation delay of a comparator may vary with overdrive (the differential input voltage) and the time between transitions in the output signal of the comparator. For example, a larger overdrive at the input of a comparator may produce a shorter propagation delay than a smaller overdrive. The propagation delay for a comparator in a pulse width modulator varies the most when the control voltage input nears the minimum or maximum voltage of the periodic waveform input to the comparator. Varying propagation delays in a comparator's output signal may adversely affect a pulse width modulator's ability to accurately control the duty cycle of the switches in a switching regulator.

Figure 9A:
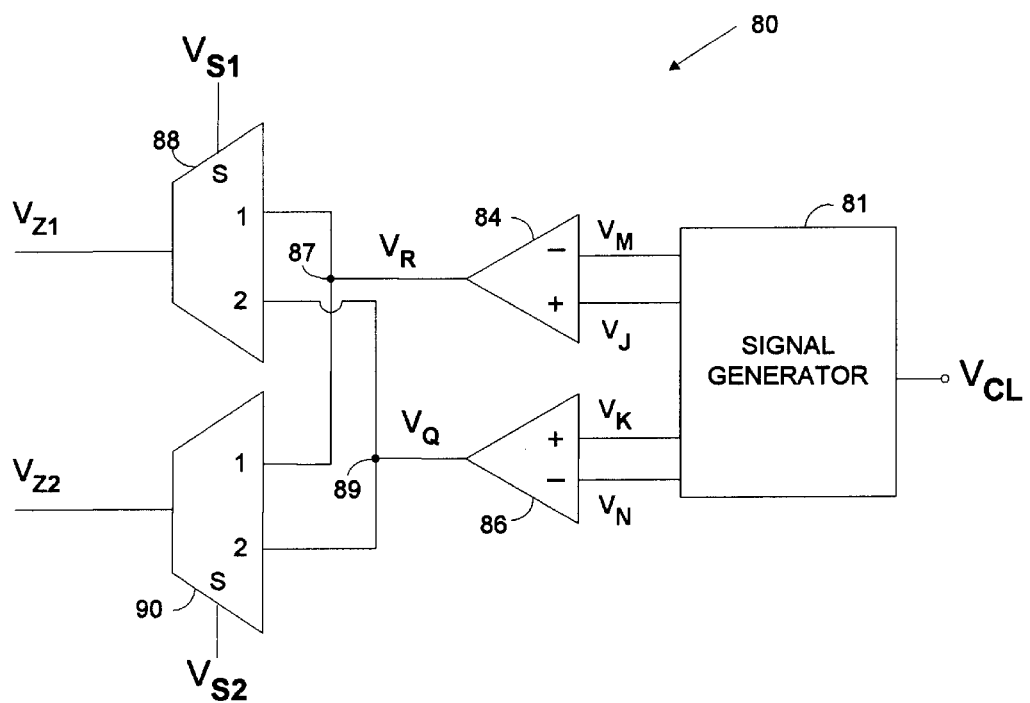
FIG. 9A is a block diagram of another illustrative embodiment of pulse width modulators that may be used in control circuits of the present invention.

A further embodiment of a pulse width modulator of the present invention is shown in FIG. 9A. Pulse width modulator 80 in FIG. 9A may be used in place of pulse width modulator 25 in FIGS. 2B, 3B, 4, and 5. Pulse width modulator circuit 80 in FIG. 9A produces substantially constant propagation delays in control signals $V_{Z1}$ and $V_{Z2}$ for 0%–100% duty cycles of the switches. Pulse width modulator 80 generates signals $V_{Z1}$ and $V_{Z2}$ using two waveform generators that each generate a periodic waveform signal, two comparators, and two multiplexers. Each of the multiplexers selects the output of one of the comparators to be signals $V_{Z1}$ and $V_{Z2}$ when the waveform signal generated by the waveform generator coupled to that comparator is not within a percentage of its minimum or maximum voltage. The percentage is determined by select signals $V_{S1}$ and $V_{S2}$. This technique helps to ensure substantially constant propagation delays in control signals $V_{Z1}$ and $V_{Z2}$. Further details of a linear pulse width modulation system are described in commonly assigned copending U.S. patent application Ser. No. 09/536,271 to Dwelley et al., filed concurrently herewith, the disclosure of which is incorporated by reference herein in its entirety.

Pulse width modulator 80 may be used in place of pulse width modulator 25 in FIGS. 2B, 3B, 4 and 5. Pulse width modulator 80 includes signal generator 81, comparators 84 and 86, and multiplexers 88 and 90. Signal generator 81 provides waveform signal $V_M$ to the inverting input of comparator 84, and waveform signal $V_N$ to the inverting input of comparator 86. Control voltage $V_{CL}$ is coupled to the signal generator 81 as an input signal. $V_{CL}$ may be generated from error amplifier 22 that monitors voltage feedback signal $V_{FB}$ as shown, for example, in FIGS. 2B, 3B, 4, and 5. Signal generator 81 also provides quasi-static signal $V_J$ to the non-inverting input of comparator 84, and quasi-static signal $V_K$ to the non-inverting input of comparator 86.

Comparator 84 provides signal $V_R$ at its output, and comparator 86 provides signal $V_Q$ at its output. The output of comparator 84 is coupled to input terminals of multiplexers 88 and 90 at node 87. The output of comparator 86 is coupled to input terminals of multiplexers 88 and 90 at node 89. Select signal $V_{S1}$ is coupled to the S input of multiplexer 88, and select signal $V_{S2}$ is coupled to the S input of multiplexer 90. The output of multiplexer 88 provides control signal $V_{Z1}$. The output of multiplexer 90 provides control signal $V_{Z2}$. Waveform signals $V_M$ and $V_N$ have the same shape and the same period T, but are time delayed with respect to each other by one half of period T. Examples of signals $V_M$ and $V_N$ are shown in FIG. 9C. Signal generator 81 also may generate other types of periodic waveforms such as sawtooth waveforms with rapidly rising edges, and sawtooth waveforms with non-rapidly rising and falling edges.

Figure 9B:
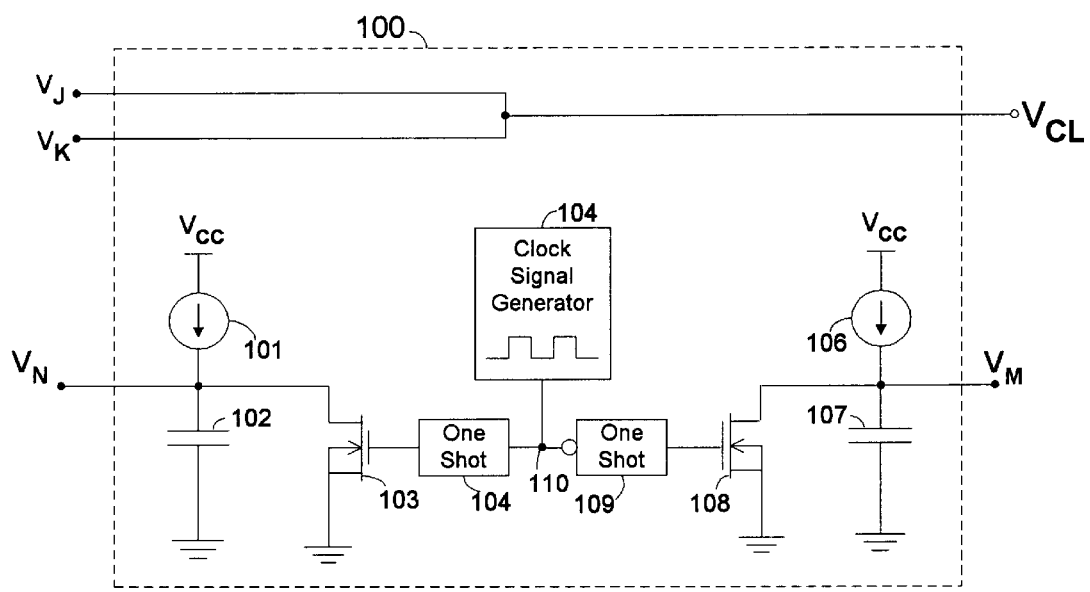
FIG. 9B is a block diagram of another illustrative embodiment of signal generators that may be used in control circuits of the present invention.
Figure 9C:
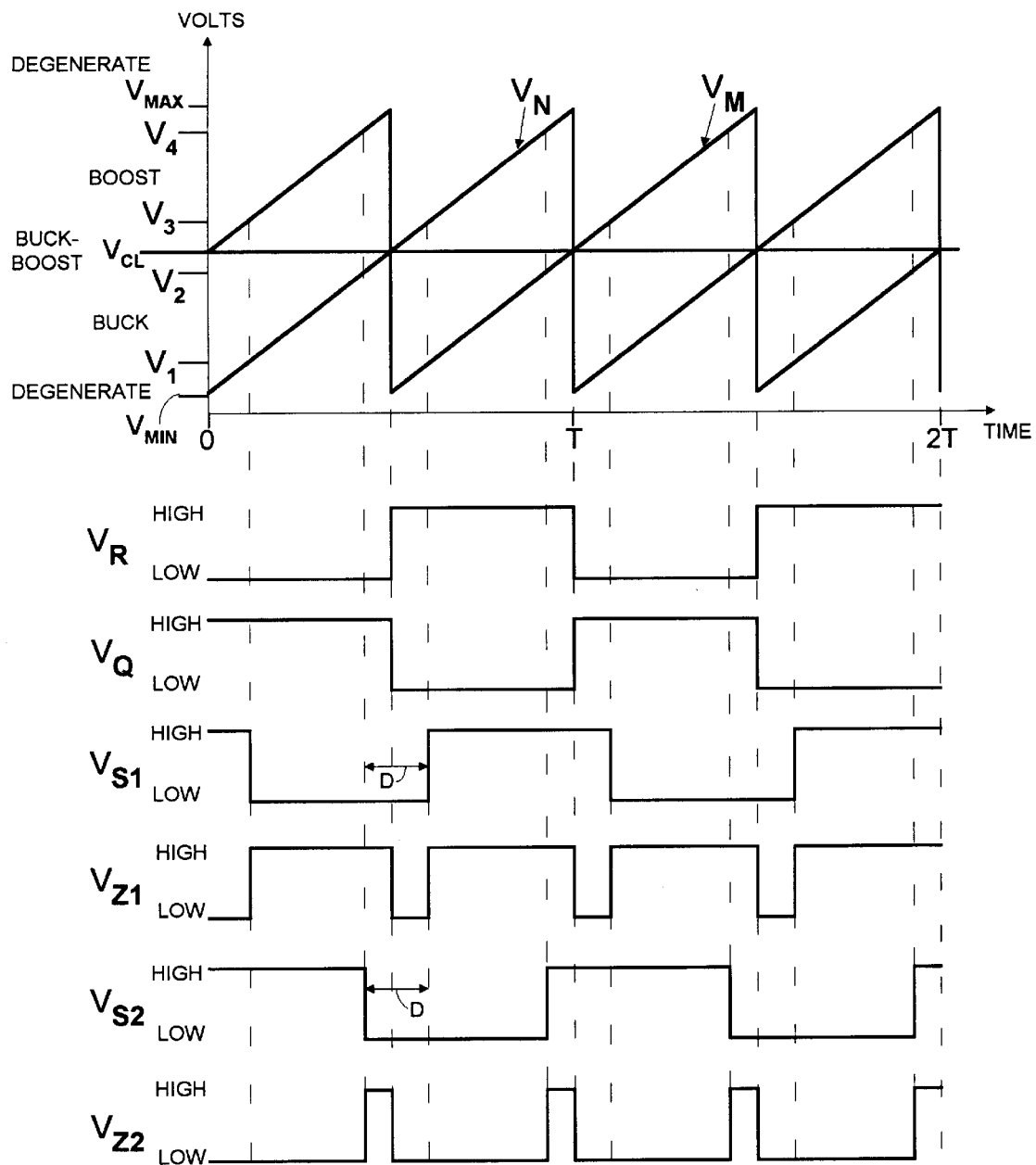
FIG. 9C is a graph of exemplary signals for the circuitry of FIGS. 9A and 9B.

Signal generator 100 in FIG. 9B is an example of signal generator 81. Signal generator 100 generates two periodic sawtooth waveforms $V_M$ and $V_N$ with rapidly falling edges as shown in FIG. 9C. Waveforms $V_M$ and $V_N$ vary between $V_{MAX}$ and $V_{MIN}$ as shown in FIG. 9C. Signal generator 100 also generates quasi-static signals $V_J$ and $V_K$ which each equal $V_{CL}$ throughout each period T. Waveform generator 100 includes clock signal generator 104, constant current sources 101 and 106, capacitors 102 and 107, n-channel MOS field effect transistors 103 and 108, and one shots 104 and 109. Constant current source 101 has a first terminal coupled to supply voltage $V_{CC}$ and a second terminal coupled to a first terminal of capacitor 102, a drain of transistor 103, and $V_N$. Capacitor 102 has a second terminal coupled to GROUND, and transistor 103 has a source coupled to GROUND. Constant current source 106 has a first terminal coupled to supply voltage $V_{CC}$ and a second terminal coupled to a first terminal of capacitor 107, a drain of transistor 108, and $V_M$. Capacitor 107 has a second terminal coupled to GROUND, and transistor 108 has a source coupled to GROUND. Clock signal generator 104 has an output terminal coupled to input terminals of one shots 104 and 109 at node 110. One shot 104 has an output coupled to the gate of transistor 103, and one shot 109 has an output coupled to the gate of transistor 108.

Clock signal generator 104 generates a square wave digital clock signal with a 50% duty cycle that varies between HIGH and LOW at node 110. During each cycle of the clock signal, constant current source 101 charges up capacitor 102 from $V_{MIN}$ to $V_{MAX}$ and constant current source 106 charges up capacitor 107 from $V_{MIN}$ to $V_{MAX}$. When the clock signal goes HIGH, the signal at the output of one shot 104 goes from LOW to HIGH turning ON transistor 103. The voltage on capacitor 102 at $V_N$ then falls from $V_{MAX}$ to $V_{MIN}$. The output of one shot 104 remains HIGH only for a brief period of time (e.g., 1% of the time that the clock signal at node 110 remains HIGH). The output of one shot 104 then transitions LOW and transistor 103 turns OFF. Constant current source 101 then begins to charge up capacitor 102 again. The output of one shot 104 remains LOW until the next rising edge of the clock signal.

When the clock signal goes LOW, the signal at the output of one shot 109 goes from LOW to HIGH turning on transistor 108. The voltage on capacitor 107 at $V_M$ then falls from $V_{MAX}$ to $V_{MIN}$. The output of one shot 109 remains HIGH only for a brief period of time (e.g., 1% of the time that the clock signal at node 110 remains LOW). The output of one shot 109 then transitions LOW and transistor 108 turns OFF. Constant current source 106 now begins charging up capacitor 107 again. The output of one shot 109 remains LOW until the next falling edge of the clock signal.

Exemplary logic signals $V_R$, $V_Q$, $V_{Z1}$, $V_{Z2}$, $V_{S1}$, and $V_{S2}$ are also shown in FIG. 9C. Signal $V_{Z1}$ controls the switching of switches A and B and signal $V_{Z2}$ controls the switching of switches C and D as discussed above with respect to previous embodiments of the invention. Comparator 84 compares $V_J$ and $V_M$ to generate $V_R$. If $V_J$ is greater than $V_M$, $V_R$ is HIGH. If $V_J$ is less than $V_M$, $V_R$ is LOW. Comparator 86 compares $V_K$ and $V_N$ to generate $V_Q$. If $V_K$ is greater than $V_N$, $V_Q$ is HIGH. If $V_K$ is less than $V_N$, $V_Q$ is LOW. Select signals $V_{S1}$ and $V_{S2}$ select which of signals $V_R$ and $V_Q$ is passed as $V_{Z1}$ and $V_{Z2}$ for a given time interval during period T using multiplexers 88 and 90. $V_{CL}$ equals $V_J$ and $V_K$ in the examples of FIGS. 9B and 9C.

Referring to FIG. 9C, when $V_{CL}$ is less than $V_4$ and greater than or equal to $V_3$, the switching regulator operates in boost mode. When $V_{CL}$ is less than $V_3$ and greater than $V_2$, the switching regulator operates in buck-boost mode. When $V_{CL}$ is less than or equal to $V_2$ and greater than $V_1$, the switching regulator operates in buck mode. As described below, the values of $V_1$ and $V_3$ are determined by the falling and rising edges of signal $V_{S1}$ and the values of $V_2$ and $V_4$ are determined by the falling and rising edges of signal $V_{S2}$.

The portions of signals $V_M$ and $V_N$ above $V_4$ and below $V_1$ are not used to generate control signals $V_{Z1}$ and $V_{Z2}$ because the propagation delays of comparators 84 and 86 may vary if $V_{CL}$ is greater than a maximum percentage of the peak-to-peak amplitude of $V_M$ and $V_N$ (e.g., 90%) or less than a minimum percentage of the peak-to-peak amplitude of $V_M$ and $V_N$ (e.g., 10%). Therefore, signal $V_{S2}$ is selected so that $V_4$ is less than the maximum percentage (e.g., 90%) of the peak-to-peak amplitude of $V_M$ and $V_N$ in which the propagation delays of comparators 84 and 86 vary. Signal $V_{S1}$ is selected so that $V_1$ is greater than the minimum percentage (e.g., 10%) of the peak-to-peak amplitude of $V_M$ and $V_N$ in which the propagation delays of comparators 84 and 86 vary.

Referring to FIG. 9C, if $V_{CL}$ is greater than or equal to $V_4$, the switching regulator operates in a degenerate mode in which the input voltage is coupled to GROUND through inductor 17 throughout each period T. If $V_{CL}$ is less than or equal to $V_1$, the switching regulator operates in a degenerate mode in which the output voltage is coupled to GROUND through the inductor 17 throughout each period T.

Select signals $V_{S1}$ and $V_{S2}$ may be digital signals as illustrated in FIG. 9C. Select signal $V_{S1}$ determines which of nodes 87 and 89 are coupled to the output of multiplexer 88. Select signal $V_{S1}$ causes multiplexer 88 to pass signal $V_R$ at node 87 as control signal $V_{Z1}$ when waveform signal $V_M$ is between $V_1$ and $V_3$, and to pass signal $V_Q$ at node 89 as control signal $V_{Z1}$ when waveform signal $V_N$ is between $V_1$ and $V_3$. When waveform signals $V_M$ and $V_N$ are between $V_1$ and $V_4$, propagation delays $t_{PHL}$ of the comparator coupled to that waveform signal are substantially constant with respect to each other, since the HIGH to LOW transitions in $V_R$ and $V_Q$ are used to form $V_{Z1}$. Propagation delays $t_{PLH}$ of comparators 84 and 86 do not need to be substantially constant, since the LOW to HIGH transitions in $V_{Z1}$ are formed by the transitions in $V_{S1}$ and not the LOW to HIGH transitions in $V_R$ and $V_Q$. However, signals $V_R$ and $V_Q$ should transition from LOW to HIGH before $V_R$ and $V_Q$ are selected as $V_{Z1}$ again.

Select signal $V_{S2}$ determines which of nodes 87 and 89 are coupled to the output of multiplexer 90. Select signal $V_{S2}$ causes multiplexer 90 to pass signal $V_R$ at node 87 as control signal $V_{Z2}$ when waveform signal $V_M$ is between $V_2$ and $V_4$, and to pass signal $V_Q$ at node 89 as control signal $V_{Z2}$ when waveform signal $V_N$ is between $V_2$ and $V_4$. When waveform signals $V_M$ and $V_N$ are between $V_1$ and $V_4$, propagation delays $t_{PHL}$ of the comparator coupled to that waveform signal are substantially constant with respect to each other, since the HIGH to LOW transitions in $V_R$ and $V_Q$ are used to form $V_{Z2}$. Propagation delays $t_{PLH}$ of comparators 84 and 86 do not need to be substantially constant, since the LOW to HIGH transitions in $V_{Z2}$ are formed by the transitions in $V_{S2}$ and not the LOW to HIGH transitions in $V_R$ and $V_Q$. However, signals $V_R$ and $V_Q$ should transition from LOW to HIGH before $V_R$ and $V_Q$ are selected as $V_{Z2}$ again.

When $V_{S1}$ is HIGH, the output of comparator 84 is coupled to the output of multiplexer 88, and $V_M$ is between $V_1$ and $V_3$ as shown in FIG. 9C. Signal $V_{Z1}$ is now the same as signal $V_R$. When $V_{S1}$ is LOW, the output of comparator 86 is coupled to the output of multiplexer 88, and $V_N$ is between $V_1$ and $V_3$ as shown in FIG. 9C. Signal $V_{Z1}$ is now the same as signal $V_Q$. When $V_{S2}$ is HIGH, the output of comparator 84 is coupled to the output of multiplexer 90, and $V_M$ is between $V_2$ and $V_4$ as shown in FIG. 9C. Signal $V_{Z2}$ is now the same as signal $V_R$. When $V_{S2}$ is LOW, the output of comparator 86 is coupled to the output of multiplexer 90, and $V_N$ is between $V_2$ and $V_4$ as shown in FIG. 9C. Signal $V_{Z2}$ is now the same as signal $V_Q$.

The buck-boost region (between $V_3$ and $V_2$) can be widened or narrowed by changing the delay (D, in FIG. 9C) between the falling edge $V_{S2}$ and the next rising edge of $V_{S1}$. The buck-boost region expands ($V_3-V_2$ gets larger) as D increases, causing an increase in the range of output-to-input voltage ratios regulated in buck-boost mode. Preferably, the buck-boost region is not expanded so that it exists for all output-to-input voltage ratios because this causes the average inductor current to increase and the efficiency of the regulator to be reduced as discussed above with respect to FIG. 6A.

The buck-boost region can be eliminated by causing the falling edge of $V_{S2}$ to occur after the rising edge of $V_{S1}$ such that D in FIG. 9C is less than zero. Preferably, the buck-boost region is not eliminated so that all output-to-input voltage ratios may be regulated at a constant duty cycle of the switches as discussed above with respect to FIG. 6A.

Persons skilled in the art further will recognize that the circuitry of the present invention may be implemented using circuit configurations other than those shown and discussed above. All such modifications are within the scope of the present invention, which is limited only by the claims which follow.

What is claimed is:

1. A method for controlling a buck-boost switching regulator circuit to supply a regulated output voltage at an output node, the buck-boost switching regulator comprising an inductor, a first switch coupled between an input voltage and a first terminal of the inductor, a second switch coupled between the first terminal of the inductor and GROUND, a third switch coupled between a second terminal of the inductor and GROUND, and a fourth switch coupled between the second terminal of the inductor and the output node, the method comprising:

generating a feedback signal that is proportional to the output voltage of the switching regulator;

controlling the duty cycle of the first switch with a first drive signal generated in response to the feedback signal;

controlling the duty cycle of the second switch with a second drive signal generated in response to the feedback signal so that the second switch is OFF when the first switch is ON, and the first switch is OFF when the second switch is ON;

controlling the duty cycle of the third switch with a third drive signal generated in response to the feedback signal so that the duty cycle of the first switch is not equal to the duty cycle of the third switch during the time that the output voltage at the output node is regulated; and controlling the duty cycle of the fourth switch with a fourth drive signal generated in response to the feedback signal so that the third switch is OFF when the fourth switch is ON, and the fourth switch is OFF when the third switch is ON.

2. The method defined in claim 1 further comprising:

generating first and second voltage signals that are proportional to the feedback signal;

providing first and second periodic waveform signals;

comparing the first voltage signal with the first periodic waveform signal to generate a first control signal, wherein the first and second drive signals are generated in response to the first control signal; and comparing the second voltage signal with the second periodic waveform signal to generate a second control signal, wherein the third and fourth drive signals are generated in response to the second control signal.

3. The method defined in claim 2 wherein providing the first and the second periodic waveform signals further comprises providing the first periodic waveform signal offset from the second periodic waveform signal by a direct current offset voltage.

4. The method defined in claim 2 wherein generating the first and the second voltage signals further comprises generating the second voltage signal offset from the first voltage signal by a direct current offset voltage.

5. The method defined in claim 2 wherein providing the first and the second periodic waveform signals further comprises providing the first and the second periodic waveform signals that have the same wave shape and the same peak-to-peak amplitude.

6. The method defined in claim 2 wherein providing the first and the second periodic waveform signals further comprises providing the second periodic waveform signal that has a different wave shape than the first periodic waveform signal.

7. The method defined in claim 2 wherein providing the first and the second periodic waveform signals further comprises providing the second periodic waveform signal that has a different peak-to-peak amplitude than the first periodic waveform signal.

8. The method defined in claim 2 wherein the first and second periodic waveform signals are sawtooth waveform signals.

9. The method defined in claim 2 wherein the first and second periodic waveform signals are triangular waveform signals.

10. The method defined in claim 1 further comprising:
generating first and second voltage signals that are proportional to the feedback signal;
providing first and second periodic waveform signals;
comparing the first voltage signal with the first periodic waveform signal to generate a first control signal;
comparing the second voltage signal with the second periodic waveform signal to generate a second control signal;
selecting the first and second control signals to generate a first selected signal, wherein the first selected signal has substantially constant propagation delays and wherein the first and second drive signals are generated in response to the first selected signal;
selecting the first and second control signals to generate a second selected signal, wherein the second selected signal has substantially constant propagation delays and wherein the third and fourth drive signals are generated in response to the second selected signal.

11. A method for controlling a buck-boost switching regulator circuit to supply a regulated output voltage at an output node, the buck-boost switching regulator comprising an inductor, a first switch coupled between an input voltage and a first terminal of the inductor, a first diode with an anode coupled to GROUND and a cathode coupled to the first terminal of the inductor, a second switch coupled between a second terminal of the inductor and GROUND, and a second diode with an anode coupled to the second terminal of the inductor and a cathode coupled to the output node, the method comprising:
generating a feedback signal that is proportional to the output voltage of the switching regulator;
controlling the duty cycle of the first switch with a first drive signal generated in response to the feedback signal; and
controlling the duty cycle of the second switch with a second drive signal generated in response to the feedback signal so that the duty cycle of the first switch is not equal to the duty cycle of the second switch during the time that the output voltage at the output node is regulated.

12. The method defined in claim 11 further comprising:
generating first and second voltage signals that are proportional to the feedback signal;
providing first and second periodic waveform signals;
comparing the first voltage signal with the first periodic waveform signal to generate a first control signal, wherein the first drive signal is generated in response to the first control signal; and
comparing the second voltage signal with the second periodic waveform signal to generate a second control signal, wherein the second drive signal is generated in response to the second control signal.

13. The method defined in claim 12 wherein providing the first and the second periodic waveform signals further comprises providing the first periodic waveform signal offset from the second periodic waveform signal by a direct current offset voltage.

14. The method defined in claim 12 wherein generating the first and the second voltage signals further comprises generating the second voltage signal offset from the first voltage signal by a direct current offset voltage.

15. The method defined in claim 12 wherein providing the first and the second periodic waveform signals further comprises providing the first and the second periodic waveform signals that have the same wave shape and the same peak-to-peak amplitude.

16. The method defined in claim 12 wherein providing the first and the second periodic waveform signals further comprises providing the second periodic waveform signal that has a different wave shape than the first periodic waveform signal.

17. The method defined in claim 12 wherein providing the first and the second periodic waveform signals further comprises providing the second periodic waveform signal that has a different peak-to-peak amplitude than the first periodic waveform signal.

18. The method defined in claim 12 wherein the first and second periodic waveform signals are sawtooth waveform signals.

19. The method defined in claim 12 wherein the first and second periodic waveform signals are triangular waveform signals.

20. The method defined in claim 11 further comprising:
generating first and second voltage signals that are proportional to the feedback signal;
providing first and second periodic waveform signals;
comparing the first voltage signal with the first periodic waveform signal to generate a first control signal;
comparing the second voltage signal with the second periodic waveform signal to generate a second control signal;
selecting the first and second control signals to generate a first selected signal, wherein the first selected signal has substantially constant propagation delays and wherein the first drive signal is generated in response to the first selected signal;
selecting the first and second control signals to generate a second selected signal, wherein the second selected signal has substantially constant propagation delays and wherein the second drive signal is generated in response to the second selected signal.

21. A method for controlling a buck-boost switching regulator circuit to supply a regulated output voltage at an output node, the buck-boost switching regulator comprising an inductor, a first switch coupled between an input voltage and a first terminal of the inductor, a second switch coupled between the first terminal of the inductor and GROUND, a third switch coupled between a second terminal of the inductor and GROUND, and a diode with an anode coupled to the second terminal of the inductor and a cathode coupled to the output node, the method comprising:
generating a feedback signal that is proportional to the output voltage of the switching regulator;
controlling the duty cycle of the first switch with a first drive signal generated in response to the feedback signal;
controlling the duty cycle of the second switch with a second drive signal generated in response to the feedback signal so that the second switch is OFF when the first switch is ON, and the first switch is OFF when the second switch is ON; and controlling the duty cycle of the third switch with a third drive signal generated in response to the feedback signal so that the duty cycle of the first switch is not equal to the duty cycle of the third switch during the time that the output voltage at the output node is regulated.

22. The method defined in claim 21 further comprising:

generating first and second voltage signals that are proportional to the feedback signal;

providing first and second periodic waveform signals;

comparing the first voltage signal with the first periodic waveform signal to generate a first control signal, wherein the first and second drive signals are generated in response to the first control signal; and comparing the second voltage signal with the second periodic waveform signal to generate a second control signal, wherein the third drive signal is generated in response to the second control signal.

23. The method defined in claim 22 wherein providing the first and the second periodic waveform signals further comprises providing the first periodic waveform signal offset from the second periodic waveform signal by a direct current offset voltage.

24. The method defined in claim 22 wherein generating the first and the second voltage signals further comprises generating the second voltage signal offset from the first voltage signal by a direct current offset voltage.

25. The method defined in claim 22 wherein providing the first and the second periodic waveform signals further comprises providing the first and the second periodic waveform signals that have the same wave shape and the same peak-to-peak amplitude.

26. The method defined in claim 22 wherein providing the first and the second periodic waveform signals further comprises providing the second periodic waveform signal that has a different wave shape than the first periodic waveform signal.

27. The method defined in claim 22 wherein providing the first and the second periodic waveform signals further comprises providing the second periodic waveform signal that has a different peak-to-peak amplitude than the first periodic waveform signal.

28. The method defined in claim 22 wherein the first and second periodic waveform signals are sawtooth waveform signals.

29. The method defined in claim 22 wherein the first and second periodic waveform signals are triangular waveform signals.

30. The method defined in claim 21 further comprising:

generating first and second voltage signals that are proportional to the feedback signal;

providing first and second periodic waveform signals;

comparing the first voltage signal with the first periodic waveform signal to generate a first control signal;

comparing the second voltage signal with the second periodic waveform signal to generate a second control signal;

selecting the first and second control signals to generate a first selected signal, wherein the first selected signal has substantially constant propagation delays and wherein the first and second drive signals are generated in response to the first selected signal;

selecting the first and second control signals to generate a second selected signal, wherein the second selected signal has substantially constant propagation delays and wherein the third drive signal is generated in response to the second selected signal.

31. A method for controlling a buck-boost switching regulator circuit to supply a regulated output voltage at an output node, the buck-boost switching regulator comprising an inductor, a first switch coupled between an input voltage and a first terminal of the inductor, a diode with an anode coupled to GROUND and a cathode coupled to the first terminal of the inductor, a second switch coupled between a second terminal of the inductor and GROUND, and a third switch coupled between the second terminal of the inductor and the output node, the method comprising:

generating a feedback signal that is proportional to the output voltage of the switching regulator;

controlling the duty cycle of the first switch with a first drive signal generated in response to the feedback signal;

controlling the duty cycle of the second switch with a second drive signal generated in response to the feedback signal so that the duty cycle of the first switch is not equal to the duty cycle of the second switch during the time that the output voltage at the output node is regulated; and controlling the duty cycle of the third switch with a third drive signal generated in response to the feedback signal so that the second switch is OFF when the third switch is ON, and the third switch is OFF when the second switch is ON.

32. The method defined in claim 31 further comprising:

generating first and second voltage signals that are proportional to the feedback signal;

providing first and second periodic waveform signals;

comparing the first voltage signal with the first periodic waveform signal to generate a first control signal, wherein the first drive signal is generated in response to the first control signal; and comparing the second voltage signal with the second periodic waveform signal to generate a second control signal, wherein the second and third drive signals are generated in response to the second control signal.

33. The method defined in claim 32 wherein providing the first and the second periodic waveform signals further comprises providing the first periodic waveform signal offset from the second periodic waveform signal by a direct current offset voltage.

34. The method defined in claim 32 wherein generating the first and the second voltage signals further comprises generating the second voltage signal offset from the first voltage signal by a direct current offset voltage.

35. The method defined in claim 32 wherein providing the first and the second periodic waveform signals further comprises providing the first and the second periodic waveform signals that have the same wave shape and the same peak-to-peak amplitude.

36. The method defined in claim 32 wherein providing the first and the second periodic waveform signals further comprises providing the second periodic waveform signal that has a different wave shape than the first periodic waveform signal.

37. The method defined in claim 32 wherein providing the first and the second periodic waveform signals further comprises providing the second periodic waveform signal that has a different peak-to-peak amplitude than the first periodic waveform signal.

38. The method defined in claim 32 wherein the first and second periodic waveform signals are sawtooth waveform signals.

39. The method defined in claim 32 wherein the first and second periodic waveform signals are triangular waveform signals.

40. The method defined in claim 31 further comprising:
generating first and second voltage signals that are proportional to the feedback signal;
providing first and second periodic waveform signals;
comparing the first voltage signal with the first periodic waveform signal to generate a first control signal;
comparing the second voltage signal with the second periodic waveform signal to generate a second control signal;
selecting the first and second control signals to generate a first selected signal, wherein the first selected signal has substantially constant propagation delays and wherein the first drive signal is generated in response to the first selected signal;
selecting the first and second control signals to generate a second selected signal, wherein the second selected signal has substantially constant propagation delays and wherein the second and third drive signals are generated in response to the second selected signal.

41. A control circuit for controlling a buck-boost switching regulator circuit for supplying a regulated output voltage at an output node, the buck-boost switching regulator comprising an inductor, a first switch coupled between an input voltage and a first terminal of the inductor, a second switch coupled between the first terminal of the inductor and GROUND, a third switch coupled between a second terminal of the inductor and GROUND, and a fourth switch coupled between the second terminal of the inductor and the output node, the control circuit comprising:
signal generator circuitry comprising an input node coupled to the output node of the switching regulator circuit, a waveform generator providing a periodic waveform at an waveform output node, and first, second, third, and fourth output nodes, the first and second output nodes coupled to the input node of the signal generator circuitry, the third and fourth output nodes coupled to the waveform output node of the waveform generator;
a first comparator circuit comprising a first and second inputs coupled to the first and third output nodes, respectively, of the signal generator circuitry;
a second comparator circuit comprising a first and second inputs coupled to the second and fourth output nodes, respectively, of the signal generator circuitry; and
logic circuitry comprising logic gates, the logic circuitry having a first input coupled to an output of the first comparator circuit, a second input coupled to an output of the second comparator circuit, and first, second, third, and fourth outputs coupled to the first, second, third, and fourth switches, respectively, wherein the first switch is OFF when the second switch is ON, the second switch is OFF when the first switch is ON, the third switch is OFF when the fourth switch is ON, and the fourth switch is OFF when the third switch is ON.

42. The control circuit defined in claim 41 wherein a direct current offset is created between the third and fourth output nodes of the signal generator circuitry.

43. The control circuit defined in claim 42 wherein the signal generator circuitry further comprises a resistor coupled between the third and fourth output nodes, and a current source coupled between the fourth output node and GROUND, the resistor and the current source creating the direct current offset.

44. The control circuit defined in claim 41 wherein a direct current offset is created between the first and second output nodes of the signal generator circuitry.

45. The control circuit defined in claim 44 wherein the signal generator circuitry further comprises a resistor coupled between the first and second output nodes, and a current source coupled between the second output node and GROUND, the resistor and the current source creating the direct current offset.

46. The control circuit defined in claim 41 wherein the waveform generator comprises first and second waveform generators, the first waveform generator providing a first periodic waveform at a first waveform output node, the second periodic waveform generator providing a second periodic waveform at a second waveform output node, the third output node of the signal generator circuitry coupled to the first waveform output node, and the fourth output node of the signal generator circuitry coupled to the second waveform output node.

47. The control circuit defined in claim 41 wherein the periodic waveform is a sawtooth waveform.

48. The control circuit defined in claim 41 wherein the periodic waveform is a triangular waveform.

49. The control circuit defined in claim 41 wherein the control circuit further comprises first and second multiplexer circuits, the first multiplexer circuit coupled between the first input of the logic circuitry and the outputs of each of the first and second comparators, the second multiplexer circuit coupled between the second input of the logic circuitry and the outputs of each of the first and second comparators.

50. The control circuit defined in claim 41 wherein the control circuit further comprises:
an amplifier circuit having first and second inputs, and an output coupled to the input node of the signal generator circuitry;
a first resistor coupled between the output node of the switching regulator circuit and the first input of the amplifier circuit; and
a second resistor coupled between the first input of the amplifier circuit and GROUND.

51. A control circuit for controlling a buck-boost switching regulator circuit for supplying a regulated output voltage at an output node, the buck-boost switching regulator comprising an inductor, a first switch coupled between an input voltage and a first terminal of the inductor, a first diode with an anode coupled to GROUND and a cathode coupled to the first terminal of the inductor, a second switch coupled between a second terminal of the inductor and GROUND, and a second diode with an anode coupled to the second terminal of the inductor and a cathode coupled to the output node, the control circuit comprising:
signal generator circuitry comprising an input node coupled to the output node of the switching regulator circuit, a waveform generator providing a periodic waveform at an waveform output node, and first, second, third, and fourth output nodes, the first and second output nodes coupled to the input node of the signal generator circuitry, the third and fourth output nodes coupled to the waveform output node of the waveform generator;
a first comparator circuit comprising a first and second inputs coupled to the first and third output nodes, respectively, of the signal generator circuitry;
a second comparator circuit comprising a first and second inputs coupled to the second and fourth output nodes, respectively, of the signal generator circuitry; and logic circuitry comprising logic gates, the logic circuitry having a first input coupled to an output of the first comparator circuit, a second input coupled to an output of the second comparator circuit, and first, and second outputs coupled to the first and second switches, respectively.

52. The control circuit defined in claim 51 wherein a direct current offset is created between the third and fourth output nodes of the signal generator circuitry.

53. The control circuit defined in claim 52 wherein the signal generator circuitry further comprises a resistor coupled between the third and fourth output nodes, and a current source coupled between the fourth output node and GROUND, the resistor and the current source creating the direct current offset.

54. The control circuit defined in claim 51 wherein a direct current offset is created between the first and second output nodes of the signal generator circuitry.

55. The control circuit defined in claim 54 wherein the signal generator circuitry further comprises a resistor coupled between the first and second output nodes, and a current source coupled between the second output node and GROUND, the resistor and the current source creating the direct current offset.

56. The control circuit defined in claim 51 wherein the waveform generator comprises first and second waveform generators, the first waveform generator providing a first periodic waveform at a first waveform output node, the second periodic waveform generator providing a second periodic waveform at a second waveform output node, the third output node of the signal generator circuitry coupled to the first waveform output node, and the fourth output node of the signal generator circuitry coupled to the second waveform output node.

57. The control circuit defined in claim 51 wherein the periodic waveform is a sawtooth waveform.

58. The control circuit defined in claim 51 wherein the periodic waveform is a triangular waveform.

59. The control circuit defined in claim 51 wherein the control circuit further comprises first and second multiplexer circuits, the first multiplexer circuit coupled between the first input of the logic circuitry and the outputs of each of the first and second comparators, the second multiplexer circuit coupled between the second input of the logic circuitry and the outputs of each of the first and second comparators.

60. The control circuit defined in claim 51 wherein the control circuit further comprises:
an amplifier circuit having first and second inputs, and an output coupled to the input node of the signal generator circuitry;
a first resistor coupled between the output node of the switching regulator circuit and the first input of the amplifier circuit; and
a second resistor coupled between the first input of the amplifier circuit and GROUND.

61. A control circuit for controlling a buck-boost switching regulator circuit for supplying a regulated output voltage at an output node, the buck-boost switching regulator comprising an inductor, a first switch coupled between an input voltage and a first terminal of the inductor, a second switch coupled between the first terminal of the inductor and GROUND, a third switch coupled between a second terminal of the inductor and GROUND, and a diode with an anode coupled to the second terminal of the inductor and a cathode coupled to the output node, the control circuit comprising:
signal generator circuitry comprising an input node coupled to the output node of the switching regulator circuit, a waveform generator providing a periodic waveform at an waveform output node, and first, second, third, and fourth output nodes, the first and second output nodes coupled to the input node of the signal generator circuitry, the third and fourth output nodes coupled to the waveform output node of the waveform generator;
a first comparator circuit comprising a first and second inputs coupled to the first and third output nodes, respectively, of the signal generator circuitry;
a second comparator circuit comprising a first and second inputs coupled to the second and fourth output nodes, respectively, of the signal generator circuitry; and
logic circuitry comprising logic gates, the logic circuitry having a first input coupled to an output of the first comparator circuit, a second input coupled to an output of the second comparator circuit, and first, second, and third outputs coupled to the first, second, and third switches, respectively, wherein the first switch is OFF when the second switch is ON, and the second switch is OFF when the first switch is ON.

62. The control circuit defined in claim 61 wherein a direct current offset is created between the third and fourth output nodes of the signal generator circuitry.

63. The control circuit defined in claim 62 wherein the signal generator circuitry further comprises a resistor coupled between the third and fourth output nodes, and a current source coupled between the fourth output node and GROUND, the resistor and the current source creating the direct current offset.

64. The control circuit defined in claim 61 wherein a direct current offset is created between the first and second output nodes of the signal generator circuitry.

65. The control circuit defined in claim 64 wherein the signal generator circuitry further comprises a resistor coupled between the first and second output nodes, and a current source coupled between the second output node and GROUND, the resistor and the current source creating the direct current offset.

66. The control circuit defined in claim 61 wherein the waveform generator comprises first and second waveform generators, the first waveform generator providing a first periodic waveform at a first waveform output node, the second periodic waveform generator providing a second periodic waveform at a second waveform output node, the third output node of the signal generator circuitry coupled to the first waveform output node, and the fourth output node of the signal generator circuitry coupled to the second waveform output node.

67. The control circuit defined in claim 61 wherein the periodic waveform is a sawtooth waveform.

68. The control circuit defined in claim 61 wherein the periodic waveform is a triangular waveform.

69. The control circuit defined in claim 61 wherein the control circuit further comprises first and second multiplexer circuits, the first multiplexer circuit coupled between the first input of the logic circuitry and the outputs of each of the first and second comparators, the second multiplexer circuit coupled between the second input of the logic circuitry and the outputs of each of the first and second comparators.

70. The control circuit defined in claim 61 wherein the control circuit further comprises:
an amplifier circuit having first and second inputs, and an output coupled to the input node of the signal generator circuitry;
a first resistor coupled between the output node of the switching regulator circuit and the first input of the amplifier circuit; and a second resistor coupled between the first input of the amplifier circuit and GROUND.

71. A control circuit for controlling a buck-boost switching regulator circuit for supplying a regulated output voltage at an output node, the buck-boost switching regulator comprising an inductor, a first switch coupled between an input voltage and a first terminal of the inductor, a diode with an anode coupled to GROUND and a cathode coupled to the first terminal of the inductor, a second switch coupled between a second terminal of the inductor and GROUND, and a third switch coupled between the second terminal of the inductor and the output node, the control circuit comprising:

signal generator circuitry comprising an input node coupled to the output node of the switching regulator circuit, a waveform generator providing a periodic waveform at an waveform output node, and first, second, third, and fourth output nodes, the first and second output nodes coupled to the input node of the signal generator circuitry, the third and fourth output nodes coupled to the waveform output node of the waveform generator;

a first comparator circuit comprising a first and second inputs coupled to the first and third output nodes, respectively, of the signal generator circuitry;

a second comparator circuit comprising a first and second inputs coupled to the second and fourth output nodes, respectively, of the signal generator circuitry; and logic circuitry comprising logic gates, the logic circuitry having a first input coupled to an output of the first comparator circuit, a second input coupled to an output of the second comparator circuit, and first, second, and third outputs coupled to the first, second, and third switches, respectively, wherein the third switch is OFF when the second switch is ON, and the second switch is OFF when the third switch is ON.

72. The control circuit defined in claim 71 wherein a direct current offset is created between the third and fourth output nodes of the signal generator circuitry.

73. The control circuit defined in claim 72 wherein the signal generator circuitry further comprises a resistor coupled between the third and fourth output nodes, and a current source coupled between the fourth output node and GROUND, the resistor and the current source creating the direct current offset.

74. The control circuit defined in claim 71 wherein a direct current offset is created between the first and second output nodes of the signal generator circuitry.

75. The control circuit defined in claim 74 wherein the signal generator circuitry further comprises a resistor coupled between the first and second output nodes, and a current source coupled between the second output node and GROUND, the resistor and the current source creating the direct current offset.

76. The control circuit defined in claim 71 wherein the waveform generator comprises first and second waveform generators, the first waveform generator providing a first periodic waveform at a first waveform output node, the second periodic waveform generator providing a second periodic waveform at a second waveform output node, the third output node of the signal generator circuitry coupled to the first waveform output node, and the fourth output node of the signal generator circuitry coupled to the second waveform output node.

77. The control circuit defined in claim 71 wherein the periodic waveform is a sawtooth waveform.

78. The control circuit defined in claim 71 wherein the periodic waveform is a triangular waveform.

79. The control circuit defined in claim 71 wherein the control circuit further comprises first and second multiplexer circuits, the first multiplexer circuit coupled between the first input of the logic circuitry and the outputs of each of the first and second comparators, the second multiplexer circuit coupled between the second input of the logic circuitry and the outputs of each of the first and second comparators.

80. The control circuit defined in claim 71 wherein the control circuit further comprises:

an amplifier circuit having first and second inputs, and an output coupled to the input node of the signal generator circuitry;

a first resistor coupled between the output node of the switching regulator circuit and the first input of the amplifier circuit; and a second resistor coupled between the first input of the amplifier circuit and GROUND.

* * * * *